(12) United States Patent
Morita et al.

(10) Patent No.: US 11,454,764 B2
(45) Date of Patent: Sep. 27, 2022

(54) OPTICAL COMMUNICATION CONNECTOR, CONTROL METHOD, AND OPTICAL COMMUNICATION APPARATUS ALIGNING FIBER AND LENS VIA SHAPE VARIATION

(71) Applicant: SONY CORPORATION, Tokyo (JP)

(72) Inventors: Hiroshi Morita, Tokyo (JP); Kazuaki Toba, Tokyo (JP); Masanari Yamamoto, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 17/250,710

(22) PCT Filed: Aug. 22, 2019

(86) PCT No.: PCT/JP2019/032927
§ 371 (c)(1),
(2) Date: Feb. 22, 2021

(87) PCT Pub. No.: WO2020/050054
PCT Pub. Date: Mar. 12, 2020

(65) Prior Publication Data
US 2021/0181424 A1   Jun. 17, 2021

(30) Foreign Application Priority Data
Sep. 4, 2018  (JP) .............................. JP2018-165283

(51) Int. Cl.
*G02B 6/32* (2006.01)
*G02B 6/38* (2006.01)
(Continued)

(52) U.S. Cl.
CPC ............... *G02B 6/32* (2013.01); *G02B 6/387* (2013.01); *G02B 6/4236* (2013.01); *G02B 26/08* (2013.01)

(58) Field of Classification Search
CPC ........ G02B 6/32; G02B 6/387; G02B 6/4236; G02B 6/4226; G02B 6/4225; G02B 6/3885; G02B 26/08; G02B 26/0875
See application file for complete search history.

(56) References Cited

U.S. PATENT DOCUMENTS 9,512,985 B2 * 12/2016 Brady ..................... F21V 13/14
10,203,247 B2 * 2/2019 Brady ..................... H01J 65/04
(Continued)

FOREIGN PATENT DOCUMENTS

JP          2-130510 A      5/1990
JP       2004-151199 A      5/2004
(Continued)

OTHER PUBLICATIONS

International Search Report and Written Opinion of PCT Application No. PCT/JP2019/032927, dated Oct. 8, 2019, 09 pages of ISRWO.

*Primary Examiner* — Andrew Jordan
(74) *Attorney, Agent, or Firm* — Chip Law Group

(57) ABSTRACT

Provided is an optical communication connector that includes a control unit (42). The control unit (42) controls alignment of a ferrule (170) and a lens (162). The ferrule (170) is to fix a fiber (23). The control unit (42) varies a shape of a shape variation member (21) on the basis of a communication quality of light entering the fiber (23) via the lens (162) to control the alignment.

20 Claims, 25 Drawing Sheets

(51) Int. Cl.
*G02B 6/42* (2006.01)
*G02B 26/08* (2006.01)

(56) References Cited

U.S. PATENT DOCUMENTS

| | | |
|---|---|---|
| 2002/0106149 A1 | 8/2002 | Tehrani |
| 2002/0181844 A1 | 12/2002 | Vaganov |
| 2004/0161193 A1* | 8/2004 | Yee .................... G02B 6/29389 385/39 |
| 2014/0240951 A1* | 8/2014 | Brady ................ G02B 6/29395 362/583 |
| 2017/0146399 A1* | 5/2017 | Brady .................... F21V 13/14 |
| 2021/0181424 A1* | 6/2021 | Morita ................... G02B 6/387 |
| 2022/0084709 A1* | 3/2022 | Hughes ................... G21K 1/00 |

FOREIGN PATENT DOCUMENTS

| | | |
|---|---|---|
| JP | 2005-140990 A | 6/2005 |
| JP | 2012-155159 | 8/2012 |
| WO | 2002/001274 A2 | 1/2002 |

* cited by examiner

OPTICAL COMMUNICATION CONNECTOR, CONTROL METHOD, AND OPTICAL COMMUNICATION APPARATUS ALIGNING FIBER AND LENS VIA SHAPE VARIATION

CROSS REFERENCE TO RELATED APPLICATIONS

This application is a U.S. National Phase of International Patent Application No. PCT/JP2019/032927 filed on Aug. 22, 2019, which claims priority benefit of Japanese Patent Application No. JP 2018-165283 filed in the Japan Patent Office on Sep. 4, 2018. Each of the above-referenced applications is hereby incorporated herein by reference in its entirety.

TECHNICAL FIELD

The present disclosure relates to an optical communication connector, a control method, and an optical communication apparatus.

BACKGROUND ART

Recently, an optical transmission system transmitting light with use of a fiber is known. Such an optical transmission system allows light to be easily transmitted to a desired location with use of the fiber. For example, in order to maintain an aperture rate of laser from an outlet of the fiber within a desired range, there is disclosed a technique of adjusting an angle between an optical axis of laser light and an entering end of the fiber which the laser light enters (e.g., see PTL 1).

CITATION LIST

Patent Literature

PTL 1: Japanese Unexamined Patent Application Publication No. 2012-155159

SUMMARY OF THE INVENTION

Problem to be Solved by the Invention

Here, a fiber is also used for communication performed between a plurality of communication apparatuses. Therefore, it is desirable to provide a technique that makes it possible to suppress degradation of quality of communication using the fiber.

Means for Solving the Problem

According to the present disclosure, there is provided an optical communication connector that includes a control unit. The control unit controls alignment of a ferrule and a lens. The ferrule is to fix a fiber. The control unit varies a shape of a shape variation member on the basis of a communication quality of light entering the fiber via the lens to control the alignment.

According to the present disclosure, there is provided a control method including: causing a processer to control alignment of a ferrule and a lens, the ferrule being to fix a fiber; and causing the processor to vary a shape of a shape variation member on the basis of a communication quality of light entering the fiber via the lens to thereby control the alignment.

According to the present disclosure, there is provided an optical communication connector that includes a control unit. The control unit controls alignment of an optical device and a lens. The control unit varies a shape of a shape variation member on the basis of a communication quality of light reaching the optical device via the lens to control the alignment.

According to the present disclosure, there is provided a control method including: causing a processor to control alignment of an optical device and a lens; and causing the processor to vary a shape of a shape variation member on the basis of a communication quality of light reaching the optical device via the lens to thereby control the alignment.

According to the present disclosure, there is provided an optical communication connector that includes a control unit. The control unit controls alignment of a first ferrule and a second ferrule. The first ferrule is to fix a first fiber. The second ferrule is to fix a second fiber. The control unit varies a shape of a shape variation member on the basis of a communication quality of light entering the first fiber via the second fiber to control the alignment.

According to the present disclosure, there is provided a control method including: causing a processor to control alignment of a first ferrule and a second ferrule, the first ferrule being to fix a first fiber, the second ferrule being to fix a second fiber; and causing the processor to vary a shape of a shape variation member on the basis of a communication quality of light entering the first fiber via the second fiber to thereby control the alignment.

According to the present disclosure, there is provided an optical communication apparatus that includes a control unit. The control unit controls alignment of a ferrule and a lens. The ferrule is to fix a fiber. The control unit varies a shape of a shape variation member on the basis of a communication quality of light entering the fiber via the lens to control the alignment.

Effects of the Invention

As described above, according to the present disclosure, there is provided a technique that makes it possible to suppress degradation of quality of communication using a fiber. Note that the above-described effect is not necessarily limitative. Any of the effects described herein or any other effect understandable from the present specification may be exerted in addition to the above-described effect or in place of the above-described effect.

MODES FOR CARRYING OUT THE INVENTION

Figure 1:
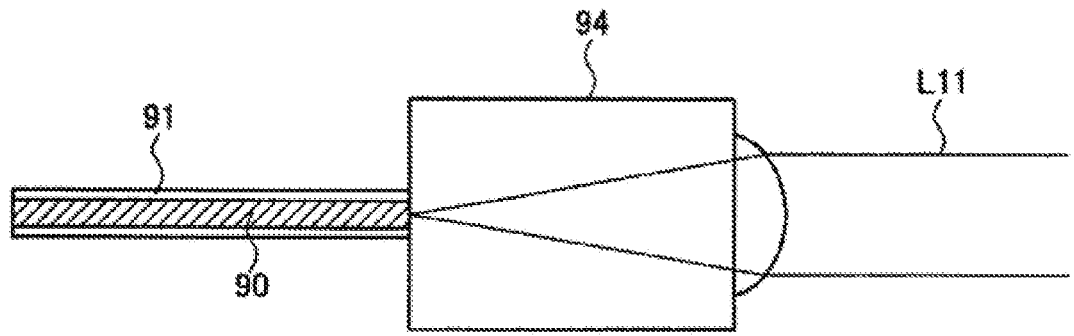
FIG. 1 is a diagram illustrating an example of achieving a collimated light with use of a multi-mode fiber and a glass member with a lens.

A description is given below in detail of preferred embodiments of the present disclosure with reference to the accompanying drawings. Note that, in this specification and the drawings, components that have substantially the same functional configuration are denoted with the same reference numerals, thereby refraining from repeatedly describing these components.

Moreover, in this specification and the drawings, two or more components that have substantially the same or similar functional configuration are sometimes distinguished from each other by attaching different numerals after the same reference numeral. However, in a case where there is no need in particular to distinguish two or more components that have substantially the same or similar functional configuration, the same reference numeral alone is attached. In addition, similar components of different embodiments are sometimes distinguished by attaching different alphabets to the same reference numeral. However, in a case where there is no need in particular to distinguish similar components from each other, the same reference numeral alone is attached.

Note that the description is given in the following order.
0. Overview
1. First Embodiment
    1.1. Configuration Examples of Optical Communication Connector
    1.2. Examples of Use of Multi-channel Fiber
    1.3. Floating Structure
    1.4. Variations of Attachment of Shape Variation Members
    1.5. Variations of Attachment Positions of Shape Variation Members
    1.6. Use of Light Transmissive Shape Variation Material
    1.7. Use of Mirror
2. Second Embodiment
    2.1. Configuration Examples of Optical Communication Connector
3. Third Embodiment
    3.1. Configuration Example of Optical Communication Connector
4. Modifications
5. Conclusion

0. OVERVIEW

First, an overview of embodiments of the present disclosure is described. Recently, an optical transmission system transmitting light with use of a fiber is known. Such an optical transmission system allows light to be easily transmitted to a desired location with use of the fiber. For example, in order to maintain an aperture rate of laser from an outlet of the fiber within a desired range, there is disclosed a technique of adjusting an angle between an optical axis of laser light and an entering end of the fiber which the laser light enters.

Here, the fiber is also used for communication between a plurality of communication apparatuses. Therefore, the embodiments of the present disclosure mainly propose a technique that makes it possible to suppress degradation of quality of communication using the fiber. Specifically, in the embodiments of the present disclosure, highly accurate alignment of an optical axis of the fiber with respect to transmitted light allows for suppression of the degradation of the quality of the communication using the fiber. For example, as a fiber mode, there are a multi-mode and a single mode. The technique according to the embodiments of the present disclosure is applicable to the multi-mode and is also applicable to the single mode. However, the technique according to the embodiments of the present disclosure is particularly suitable for the single mode.

FIG. 1 is a diagram illustrating an example of achieving a collimated light with use of a multi-mode fiber and a with-lens glass member. Referring to FIG. 1, there is a core 90 inside a multi-mode fiber 91. In a case where the fiber 91 serves as a transmitting side, light outputted from the fiber 91 passes through the with-lens glass member 94 to be a collimated light L11, and reaches a receiving side. In contrast, in a case where the fiber 91 serves as the receiving side, the collimated light L11 from the transmitting side is collected by the with-lens glass member 94 and reaches the fiber 91 on the receiving side.

In a case where the multi-mode is used, a diameter of the core 90 is typically about 50 um to 62.5 um. Therefore, in the case where the multi-mode is used, it is relatively easy to collect the collimated light L11 outputted from the fiber on the transmitting side to the fiber on the receiving side.

Figure 2:
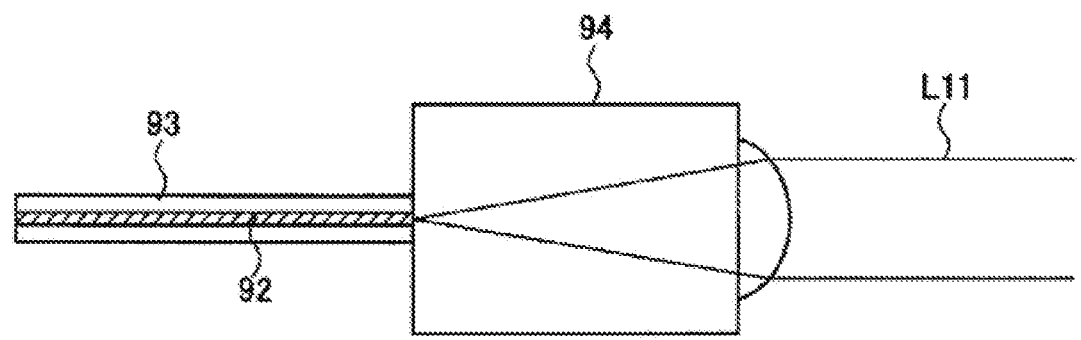
FIG. 2 is a diagram illustrating an example of achieving a collimated light with use of a single-mode fiber and a glass member with a lens.

FIG. 2 is a diagram illustrating an example of achieving a collimated light with use of a single-mode fiber and a with-lens glass member. Referring to FIG. 2, there is a core 92 inside a single-mode fiber 93. In a case where the single mode is used, a diameter of the core 92 is typically from 8 um to 10 um. That is, the diameter of the core 92 in the case where the single mode is used is typically about ⅛ to ⅕ of the diameter of the core 90 in the case where the multi-mode is used. Therefore, particularly in the case where the single mode is used, there is a need to perform alignment of an optical axis of the fiber with high accuracy in order to suppress degradation of quality of communication, as compared to the case where the multi-mode is used.

Typically, in order to perform alignment of the optical axis of the fiber with high accuracy, there is a need to use a member that is easy to process or a member that exerts less distortion resulting from heat or an external cause. Therefore, in the case where the single mode is used, a cost tends to increase, as compared with the case where the multi-mode is used. To address this, particularly in the case where the single mode is used, it is required to provide a technique of aligning the optical axis of the fiber with high accuracy while suppressing an increase in cost.

In the above, the overview of the embodiments of the present disclosure has been described.

1. FIRST EMBODIMENT

Hereinafter, a first embodiment of the present disclosure is described.

1.1. Configuration Examples of Optical Communication Connector

Figure 3:
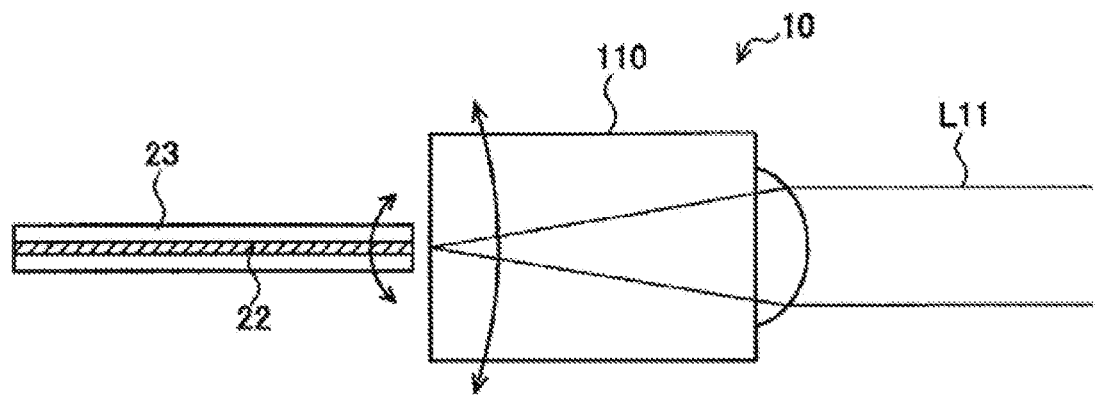
FIG. 3 is a diagram for describing an overview of an optical communication connector according to a first embodiment of the present disclosure.

First, a configuration example of an optical communication connector according to the first embodiment of the present disclosure is described. FIG. 3 is a diagram for describing an outline of the optical communication connector according to the first embodiment of the present disclosure. As illustrated in FIG. 3, an optical communication connector 10 according to the first embodiment of the present disclosure includes a light transmitting member 110 and a fiber 23. Inside the fiber 23, there is a core 22. The light transmitting member 110 may be configured to include glass or may be configured to include resin. Note that the fiber is also referred to as an optical fiber.

The optical communication connector 10 according to the first embodiment of the present disclosure physically varies a position of the fiber 23, to thereby control a position of an axis (hereinafter, also referred to as an "optical axis") of the fiber 23. Alternatively, the optical communication connector 10 according to the first embodiment of the present disclosure physically varies a position of the light transmitting member 110, to thereby adjust a light collection point derived from the light transmitting member 110. Thus, a positional relationship between the optical axis of the fiber 23 and the light collection point derived from the light transmitting member 110 is controlled, thereby suppressing degradation of communication quality.

Note that, in the first embodiment of the present disclosure, mainly described is an example in which the optical communication connector 10 generates the collimated light L11 with use of the light transmitting member 110. However, as will be described later, the optical communication connector 10 according to the embodiments of the present disclosure is not limited to the example in which the collimated light L11 is generated with use of the light transmitting member 110. For example, the optical communication connector 10 according to the embodiment of the present disclosure is also applicable to a PC (Physical Contact) type in which fibers are butted together in a connector. A further detailed implementation example of the optical communication connector 10 illustrated in FIG. 3 is described below.

Figure 4:
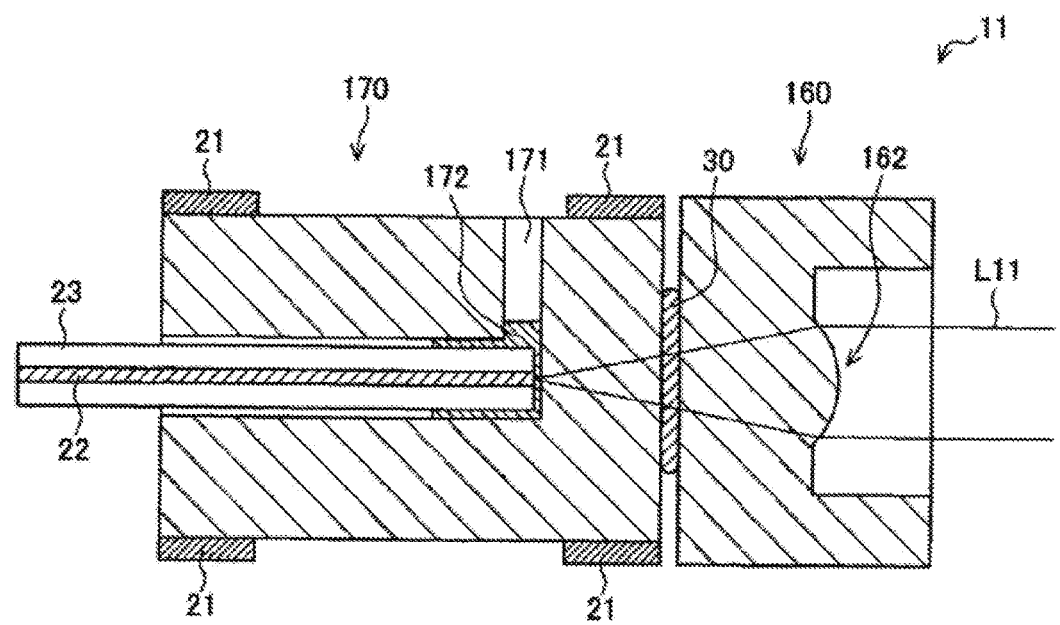
FIG. 4 is a diagram illustrating a configuration example of the optical communication connector according to the same embodiment.

FIG. 4 is a diagram illustrating a configuration example of an optical communication connector according to the first embodiment of the present disclosure. As illustrated in FIG. 4, an optical communication connector 11 according to the first embodiment of the present disclosure includes a with-lens light transmitting member 160 and a ferrule 170 that are independent of each other. The with-lens light transmitting member 160 is an example of the light transmitting member 110 and includes a lens 162. Note that the with-lens light transmitting member 160 may be configured to include glass or may be configured to include resin. The ferrule 170 is a member fixing the fiber 23.

As illustrated in FIG. 4, it is preferable that a light transmissive material 30 be provided between the with-lens light transmitting member 160 and the ferrule 170. The provision of the light transmissive material 30 between the with-lens light transmitting member 160 and the ferrule 170 makes it possible to prevent reflection of light at an interface. For example, the light transmissive material 30 may be configured to include resin. Note that, instead of providing the light transmissive material 30 between the with-lens light transmitting member 160 and the ferrule 170, each of end surfaces of the with-lens light transmitting member 160 and the ferrule 170 may be provided with AR (Anti Reflection) coating.

It is preferable that the ferrule 170 have a hole 171 into which a fiber fixing agent 172 is injected. For example, the fiber fixing agent 172 may be configured to include an adhesive, and the adhesive may be configured to include a light transmissive resin. The fiber fixing agent 172 is injected from the hole 171, and the fiber 23 is fixed to the ferrule 170 by the fiber fixing agent 172. Thereby, the fiber 23 is allowed to be stably fixed to the ferrule 170.

Referring to FIG. 4, eight shape variation members 21 (shape variation members 21-1 to 21-4 on a closer side of the paper plane and shape variation members 21-5 to 21-8 on a farther side of the paper plane) are coupled to the ferrule 170. However, the number of the shape variation members 21 is not limited. In the example illustrated in FIG. 4, each of the shape variation members 21 is directly coupled to the ferrule 170. However, as will be described later, each of the shape variation members 21 may be indirectly coupled to the ferrule 170 with another member in between. Further, as will be described later, the positions at which the respective shape variation members 21 are provided are also not limited. For example, each of the shape variation members 21 may be coupled (directly or indirectly) to the with-lens light transmitting member 160.

In the following, mainly assumed is a case where each of the shape variation members 21 includes a piezo (Piezo) element. In such a case, the shape of each of the shape variation members 21 is allowed to be varied by varying a voltage applied to the piezo element. However, a specific configuration of each of the shape variation members 21 is not limited. By varying the shape of each of the shape variation members 21, a position of the ferrule 170 coupled directly or indirectly to each of the shape variation members 21 is physically moved. Thus, a positional relationship between the ferrule 170 and the with-lens light transmitting member 160 is controlled. This allows a position of the core 22 to be aligned with a desired position.

Figure 5:
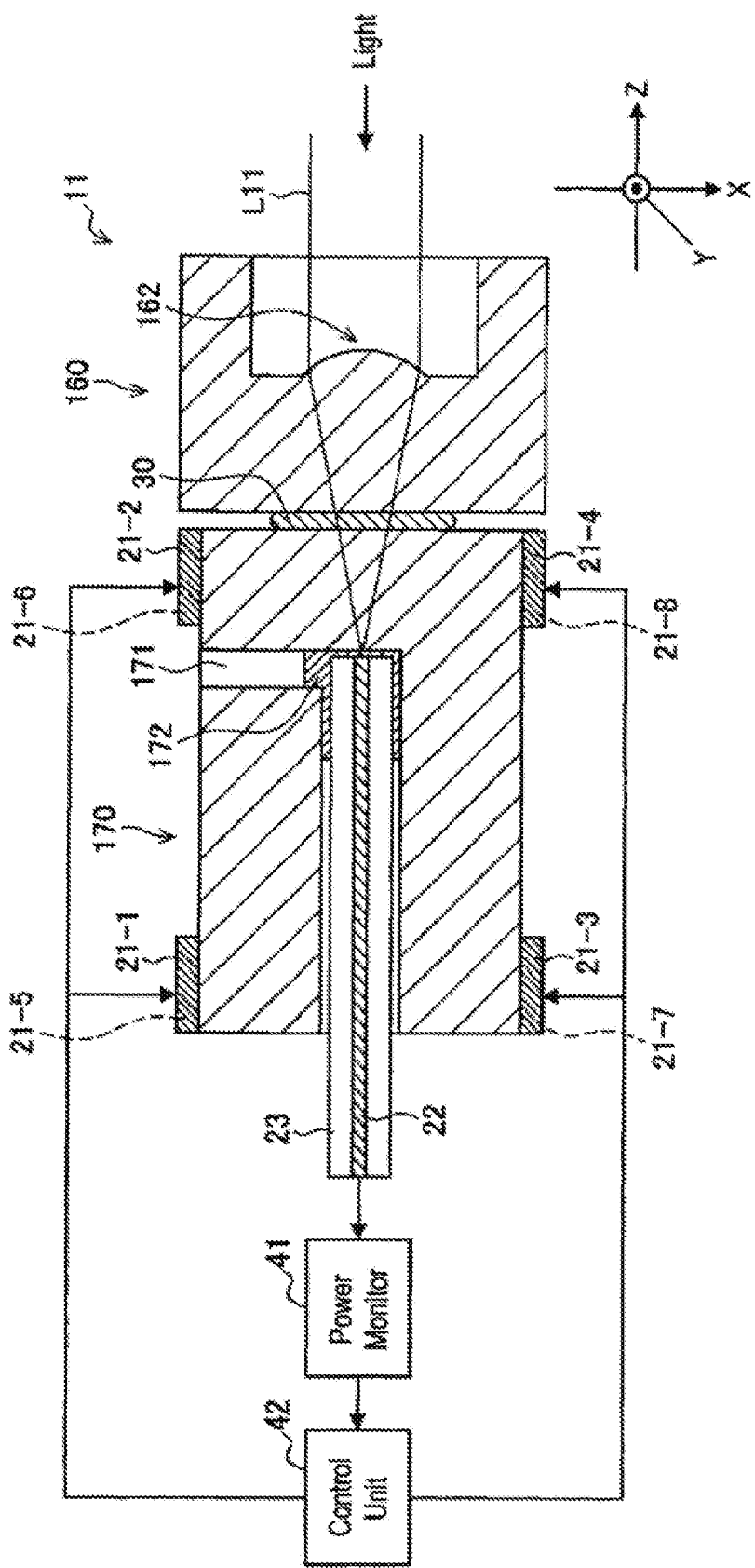
FIG. 5 is a diagram illustrating a configuration example of the optical communication connector including a power monitor and a control unit.

FIG. 5 is a diagram illustrating a configuration example of an optical communication connector including a power monitor and a control unit. As illustrated in FIG. 5, the optical communication connector 11 may include a power monitor 41 and a control unit 42. Note that the optical communication connector 11 may not necessarily include the control unit 42. That is, the control unit 42 may be present outside the optical communication connector 11 (e.g., at a position away from the optical communication connector 11). A part or all of the light collected by the lens 162 enters one end of the fiber 23, is outputted from another end of the fiber 23, and is detected by the power monitor 41.

The power monitor 41 detects an absolute value of power of the light entering the one end of the fiber 23 (the light outputted from the other end of the fiber 23), and notifies the control unit 42 of the detected absolute value of the power of the light. A scheme of detecting the absolute value of the power of the light is not limited. For example, as the detection scheme of the absolute value of the power of the light, a photoelectric conversion scheme may be used that converts light into an electric signal by a photodiode or the like and detects the absolute value of the power on the basis of the electrical signal after the conversion. Alternatively, as the detection scheme of the absolute value of the power of the light, a thermoelectric conversion scheme may be used that causes light energy to be absorbed by a photoreceptor and measures thermal energy.

The control unit 42 controls alignment of the ferrule 170 and the with-lens light transmitting member 160 (i.e., alignment of the ferrule 170 and the lens 162). Specifically, the control unit 42 varies the shape of each of the shape variation members 21 on the basis of a communication quality of the light entering the fiber 23 via the lens 162, thereby controlling the alignment of the ferrule 170 and the with-lens light transmitting member 160.

For example, as described above, each of the shape variation members 21 includes the piezo element. The control unit 42 may vary the shape of each of the shape variation members 21 by varying the voltage applied to the piezo element. As will be described later, the shape of each of the shape variation members 21 is allowed to be swiftly switched as a result of including the piezo element.

Here, as an example of the communication quality, mainly assumed is a case where the absolute value of the power of the light entering the fiber 23 is used. The greater the absolute value of the power of the light is, the higher the communication quality becomes. However, the communication quality is not limited to such an example. For example, the communication quality may be the number of times of errors caused in the light entering the fiber 23. The greater the number of times of errors is, the lower the communication quality becomes. The number of times of errors may include an error rate detected with use of an error correction code. Alternatively, the number of times of errors may include a BER (Bit Error Rate) derived from subsequent circuits.

A specific alignment method is not limited. The control unit 42 acquires communication qualities corresponding to two or more respective positional relationships between the ferrule 170 and the with-lens light transmitting member 160 from the power monitor 41. Further, the control unit 42 may determine the maximum communication quality of the communication qualities corresponding to the two or more respective relationships between the ferrule 170 and the with-lens light transmitting member 160. In accordance with the positional relationship corresponding to the maximum communication quality, the control unit 42 may control the alignment of the ferrule 170 and the with-lens light transmitting member 160.

Alternatively, the control unit 42 may determine the maximum communication quality in a stepwise manner. As a result, a speed of searching for the maximum communication quality is allowed to be increased. That is, in a case where the two or more positional relationships between the ferrule 170 and the with-lens light transmitting member 160 include several sections, a section having the maximum representative value may be determined on the basis of representative values of the communication qualities belonging to the respective sections, and the maximum communication quality may be obtained from the communication quality belonging to the section having the maximum representative value. Further, the control unit 42 may control the alignment of the ferrule 170 and the with-lens light transmitting member 160 in accordance with the positional relationship corresponding to the maximum communication quality.

Alternatively, the control unit 42 may acquire the communication qualities corresponding to the several respective positional relationships between the ferrule 170 and the with-lens light transmitting member 160. The control unit 42 may estimate, from the communication qualities corresponding to the several respective positional relationships, a positional relationship corresponding to the maximum communication quality (i.e., how much the positional relationship between the ferrule 170 and the with-lens light transmitting member 160 needs to be varied to obtain the maximum communication quality). Further, the control unit 42 may control the alignment of the ferrule 170 and the with-lens light transmitting member 160 in accordance with the estimated positional relationship.

Here, because each of the shape variation members 21 is coupled to the ferrule 170, assumed is a case where the control unit 42 varies the shape of each of the shape variation members 21 to control the position of the ferrule 170, thereby controlling the positional relationship between the ferrule 170 and the with-lens light transmitting member 160. However, as will be described later, in a case where each of the shape variation members 21 is coupled to the with-lens light transmitting member 160, the control unit 42 may vary the shape of each of the shape variation members 21 to control the position of the with-lens light transmitting member 160, thereby controlling the positional relationship between the ferrule 170 and the with-lens light transmitting member 160.

The control unit 42 may be allowed to move or rotate the position of the ferrule 170 in any direction. Further, the control unit 42 may control the shapes of the respective shape variation members 21 to be the same shape at the same time. However, it is desirable that the control unit 42 be allowed to control the shapes of the respective shape variation members 21 independently. The control unit 42 allows for alignment in two or more different directions by controlling the shapes of the respective shape variation members 21 independently.

In the following, for convenience of description, as illustrated in FIG. 5, among directions orthogonal to an axial direction of the fiber 23, an upper-lower direction of the ferrule 170 is described as an "X-axis direction", a left-right direction of the ferrule 170 is described as a "Y-axis direction". Further, a direction parallel to the axial direction of the fiber 23 is described as a "Z-axis direction".

For example, in a case where each of the shape variation members 21 is coupled to a surface, of the ferrule 170, parallel to the axial direction of the fiber 23, the control unit 42 is allowed to control the alignment of the ferrule 170 in a direction orthogonal to the axial direction of the fiber 23 by varying the shape of each of the shape variation members 21.

Specifically, as illustrated in FIG. 5, in a case where each of the shape variation members 21 is coupled to any of upper and lower surfaces, of the ferrule 170, parallel to the axial direction of the fiber 23, the control unit 42 is allowed to vary the shapes of the shape variation members 21 (e.g., to vary the shapes of the shape variation members 21-1, 21-2, 21-5, and 21-6 on the upper surface of the ferrule 170, or to vary the shapes of the shape variation members 21-3, 21-4, 21-7, and 21-8 on the lower surface of the ferrule 170) to thereby control the alignment of the ferrule 170 in the X-axis direction.

Further, the control unit 42 is allowed to vary the shapes of the shape variation members 21 (e.g., to vary the shapes of the shape variation members 21-1 and 21-5 on the upper surface of the ferrule 170 and on a farther side from the with-lens light transmitting member 160 and the shapes of the shape variation members 21-4 and 21-8 on the lower surface of the ferrule 170 and on a closer side to the with-lens light transmitting member 160, or to vary the shapes of the shape variation members 21-2 and 21-6 on the upper surface of the ferrule 170 and on the closer side to the with-lens light transmitting member 160 and the shapes of the shape variation members 21-3 and 21-7 on the lower surface of the ferrule 170 and on the farther side from the with-lens light transmitting member 160) to thereby control the alignment of the ferrule 170 in an Y-axis rotational direction.

Further, the control unit 42 is allowed to vary the shapes of the shape variation members 21 (e.g., to vary the shapes of the shape variation members 21-1 and 21-2 on the upper surface of the ferrule 170 and on the closer side of the paper plane and the shapes of the shape variation members 21-7 and 21-8 on the lower surface of the ferrule 170 and on the farther side of the paper plane, or to vary the shapes of the shape variation members 21-5 and 21-6 on the upper surface of the ferrule 170 and on the farther side of the paper plane and the shapes of the shape variation members 21-3 and 21-4 on the lower surface of the ferrule 170 and on the closer side of the paper plane) to thereby control the alignment of the ferrule 170 in a Z-axis rotational direction.

In the example illustrated in FIG. 5, the control unit 42 is allowed to perform the alignment of the ferrule 170 in each of the X-axis direction, the Y-axis rotational direction, and the Z-axis rotational direction. However, as will be described later, the control unit 42 is also allowed to perform the alignment of the ferrule 170 in each of the Z-axis direction, the Y-axis direction, and the X-axis rotational direction, depending on the positions where the respective shape variation members 21 are provided. That is, the control unit 42 is allowed to perform the alignment of the ferrule 170 in each of the X-axis direction, the Y-axis direction, the Z-axis direction, the X-axis rotational direction, the Y-axis rotational direction, and the Z-axis rotational direction.

A timing at which the alignment of the ferrule 170 and the with-lens light transmitting member 160 is performed is not limited. For example, the control unit 42 may control the alignment at predetermined cycles. Alternatively, the control unit 42 may determine whether or not data (sensor data) obtained from a predetermined sensor satisfies a predetermined condition, and may control the alignment in a case where the sensor data satisfies the predetermined condition. For example, the predetermined condition may be a condition that a sensor value exceeds a threshold. Further, a type of the sensor is not limited. For example, the sensor may include an acceleration sensor or may include a gyro sensor.

A position at which the sensor is provided is not limited. For example, it may be provided on a mobile body the same as a mobile body (e.g., a vehicle or the like) on which the optical communication connector 11 is provided. The alignment is controlled by following a shift in the optical axis due to vibration of the mobile body, thereby allowing for suppression of degradation of the communication quality. A direction of the alignment may be uniformly determined, but it is desirable that the direction of the alignment be controlled in accordance with the sensor data. That is, the control unit 42 may determine whether or not the sensor data satisfies the predetermined condition for each of the two or more directions, and may control the alignment in a direction corresponding to the direction with the predetermined condition satisfied.

Here, the two or more directions may be a part or all of the X-axis direction, the Y-axis direction, the Z-axis direction, the X-axis rotational direction, the Y-axis rotational direction, and the Z-axis rotational direction. Particularly, in order to be allowed to control the alignment following a movement having high-speed variation (e.g., vibration of the vehicle or the like), it is desirable that each of the shape variation members 21 include an element (such as a piezo element) that is able to control a variation amount of the positional relationship between the ferrule 170 and the with-lens light transmitting member 160 by swiftly switching an applied voltage.

Figure 6:
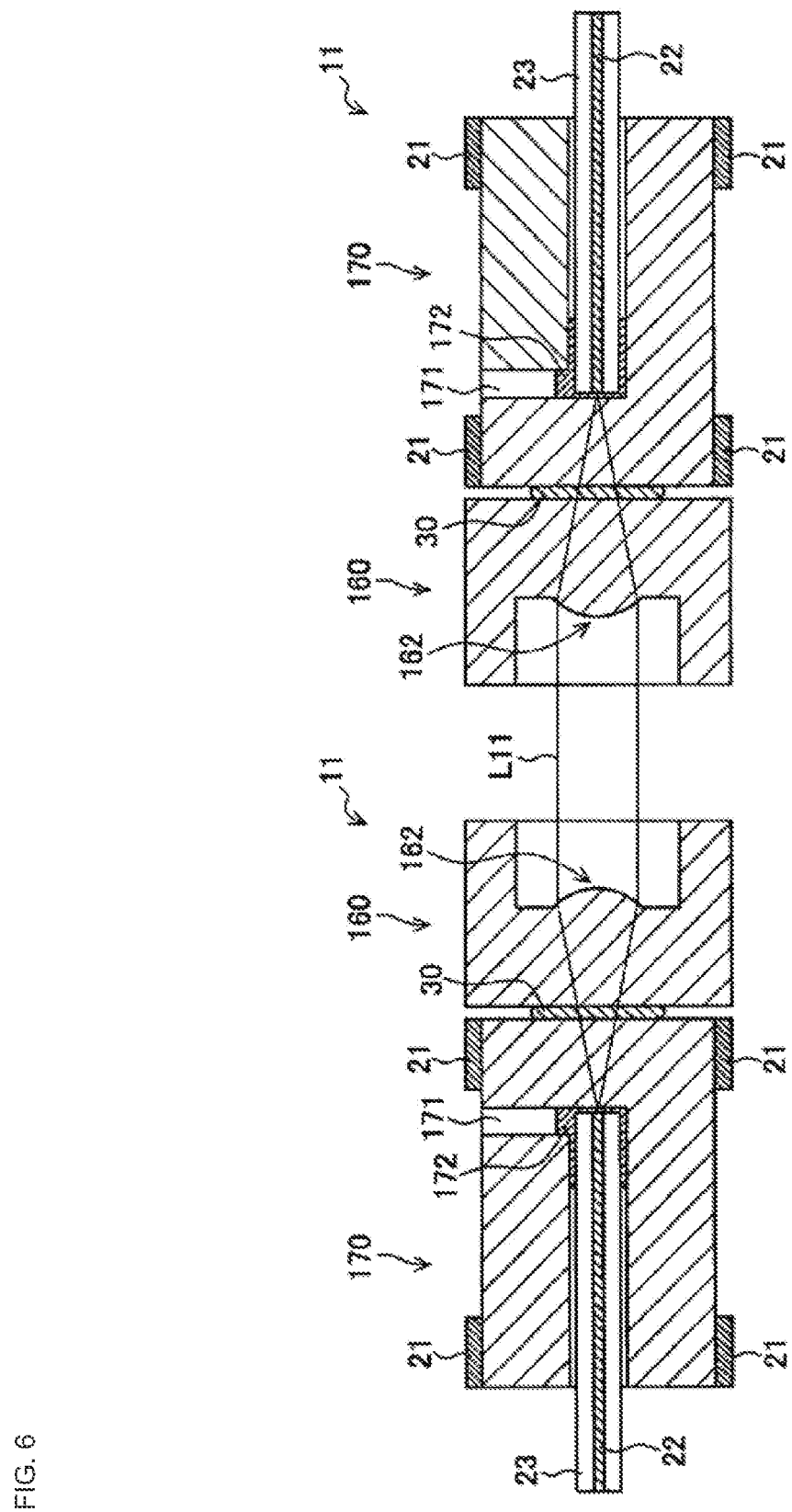
FIG. 6 is a diagram illustrating an example in which communication is performed between two optical communication connectors.

FIG. 6 is a diagram illustrating an example in which communication is performed between two optical communication connectors 11. Referring to FIG. 6, an example is illustrated in which the two optical communication connectors 11 are opposed to each other, and the collimated light L11 is communicated between the two optical communication connectors 11. If the above-described alignment of the ferrule 170 and the with-lens light transmitting member 160 is performed in each of the two optical communication connectors 11, degradation of quality of the communication performed between the two optical communication connectors 11 is suppressed.

1.2. Examples of Use of Multi-Channel Fiber

Figure 7:
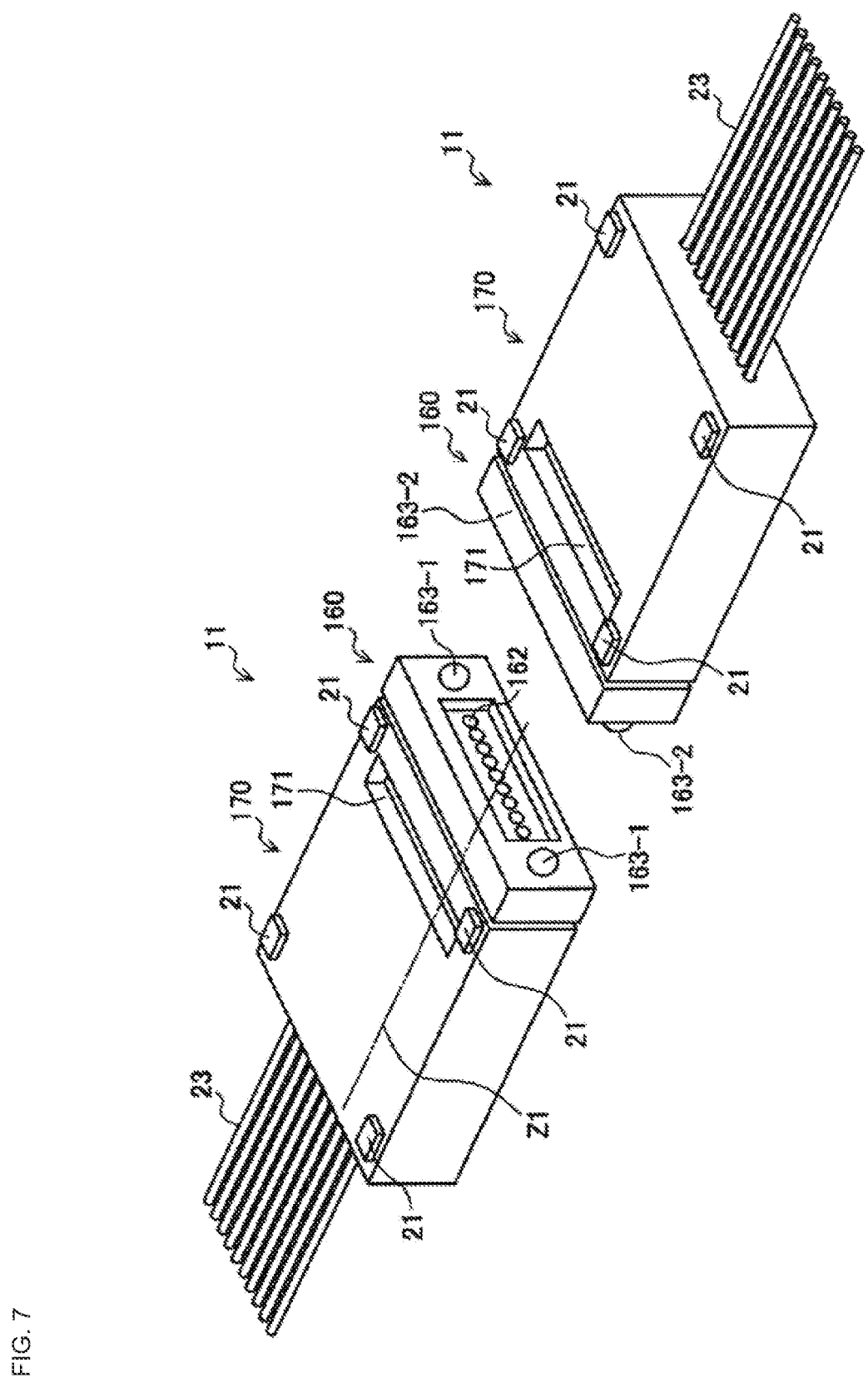
FIG. 7 is a diagram illustrating an example where a multi-channel fiber is used.

In the above, the example where the single fiber 23 is used for communication (an example in which a single-channel fiber is used) has been described. However, two or more fibers 23 may be used for communication (a multi-channel fiber may be used). FIG. 7 is a diagram illustrating an example where a multi-channel fiber is used. Referring to FIG. 7, multiple channels (two or more fibers 23) are fixed to the ferrule 170. Further, the with-lens light transmitting member 160 includes the lens 162 (a lens array) corresponding to the multiple channels (the two or more fibers 23). Further, the control unit 42 controls the alignment of the ferrule 170 and the with-lens light transmitting member 160.

On this occasion, the control unit 42 may control the alignment by varying the shape of each of the shape variation members 21 on the basis of the communication quality of the light entering the multiple channels (the two or more fibers 23) via the lens array. This makes it unnecessary for the control unit 42 to control the positions of the multiple channels (the two or more fibers 23) independently, and allows for the control unit 42 to control the positions of the multiple channels (the two or more fibers 23) collectively.

The control unit 42 may be allowed to move or rotate the position of the ferrule 170 in any direction also in a case where the multi-channel fiber is used, as with the case where the single-channel fiber is used. In particular, as with the alignment in the Z-axis rotational direction described above, the control unit 42 is allowed to control the alignment of the ferrule 170 in a rotational direction of a central axis (in FIG. 7, a Z1-axis) of the multiple channels (the two or more fibers 23) by varying the shapes of the respective shape variation members 21.

Note that, referring to FIG. 7, the with-lens light transmitting member 160 of one of the optical communication connectors 11 is provided with two recesses 163-1, and the with-lens light transmitting member 160 of the other of the optical communication connectors 11 is provided with two convexes 163-2. Further, by fitting the two recesses 163-1 to the opposing respective convexes 163-2, the two optical communication connectors 11 are coupled. However, a method of coupling the two optical communication connectors 11 is not limited to such an example. For example, the two optical communication connectors 11 may be coupled with use of a pin, or may be coupled by any other method.

1.3. Floating Structure

Here, in order to allow the position of the ferrule 170 to be controllable as described above, a method of making the ferrule 170 have a floating structure (without fixing the ferrule 170 to an outer member of the optical communication connector 11) is conceivable.

Figure 8:
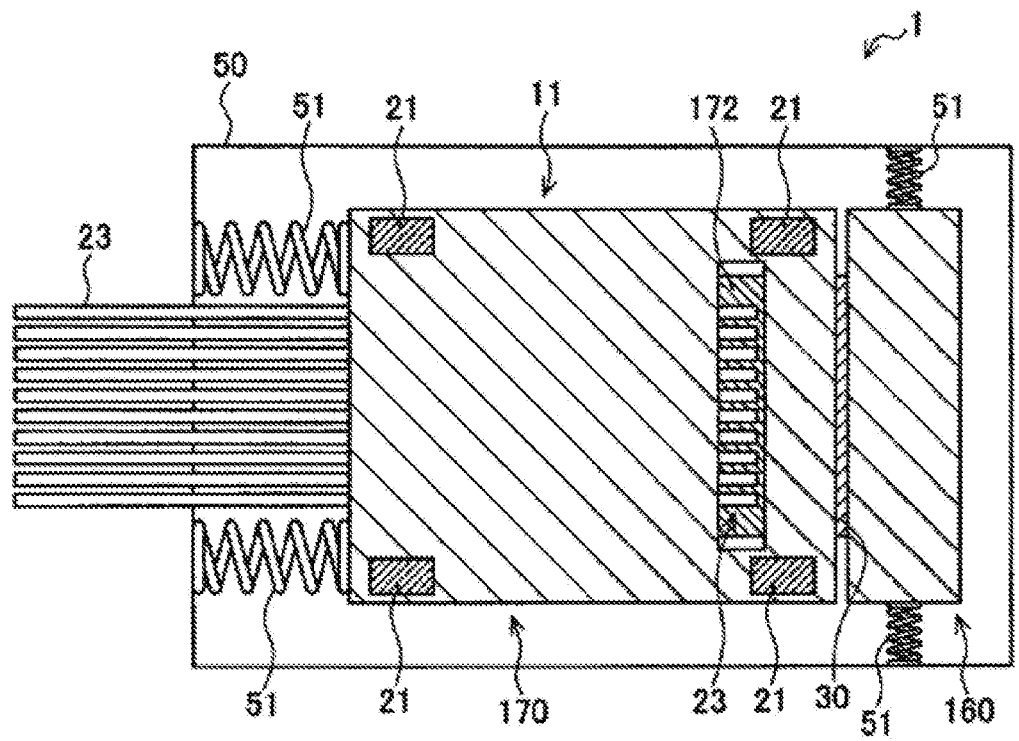
FIG. 8 is a diagram illustrating an example in which a ferrule has a floating structure.

FIG. 8 is a diagram illustrating an example in which the ferrule 170 has the floating structure. The optical communication connector 11 illustrated in FIG. 8 is a diagram viewing, from above, the optical communication connector 11 illustrated in FIG. 4. Further, FIG. 8 illustrates a connector outer member 50 (a part corresponding to an exterior of the connector which a user touches by his or her hand) that covers the ferrule 170 and the with-lens light transmitting member 160. The optical communication connector 1 with an outer member includes the optical communication connector 11, the connector outer member 50, the eight shape variation members 21 (the shape variation members 21 provided four on each of the upper and lower surfaces of the ferrule 170), and four elastic bodies 51.

Further, referring to FIG. 8, the connector outer member 50 and the ferrule 170 are coupled by two elastic bodies 51 (in FIG. 8, springs). This allows the ferrule 170 to be movable with respect to the connector outer member 50. Note that, in a case where the position of the ferrule 170 does not need to be controlled, the ferrule 170 may be fixed to the connector outer member 50. The number and positions of the elastic bodies 51 are not limited. Further, as illustrated in FIG. 8, each of the elastic bodies 51 may be directly coupled to the connector outer member 50 and the ferrule 170, or may be indirectly coupled to the connector outer member 50 and the ferrule 170 with another member in between.

Further, referring to FIG. 8, the connector outer member 50 and the with-lens light transmitting member 160 are coupled by two elastic bodies 51 (in FIG. 8, springs). This allows the with-lens light transmitting member 160 to be movable with respect to the connector outer member 50. Note that, in a case where the position of the with-lens light transmitting member 160 does not need to be controlled, the with-lens light transmitting member 160 may be fixed to the connector outer member 50. The number and positions of the elastic bodies 51 are not limited. Further, as illustrated in FIG. 9, each of the elastic bodies 51 may be directly coupled to the connector outer member 50 and the with-lens light transmitting member 160, or may be indirectly coupled to the connector outer member 50 and the with-lens light transmitting member 160 with another member in between.

Figure 9:
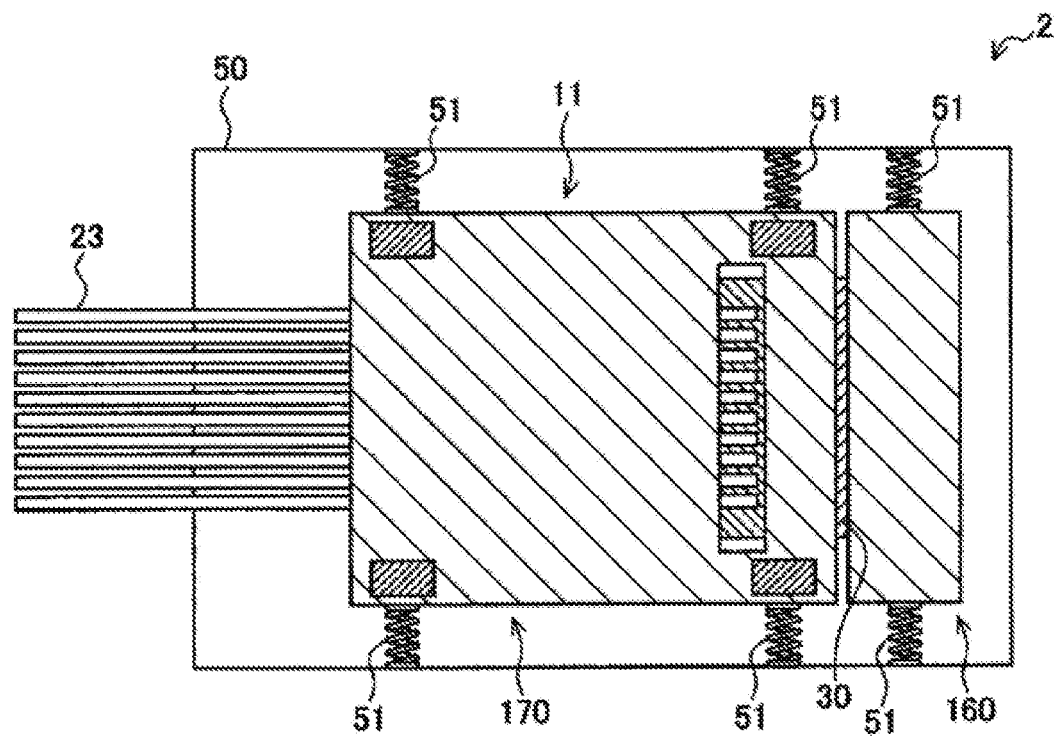
FIG. 9 is a diagram illustrating another example in which the ferrule has the floating structure.

FIG. 9 is a diagram illustrating another example in which the ferrule 170 has the floating structure. An optical communication connector 2 with an outer member includes the optical communication connector 11, the connector outer member 50, the eight shape variation members 21 (the shape variation members 21 provided by four on each of the upper and lower surfaces of the ferrule 170), and six elastic bodies 51. Unlike the optical communication connector 1 with the outer member illustrated in FIG. 8, the optical communication connector 2 with the outer member has four elastic bodies 51 coupled to the left and right surfaces of the ferrule 170.

1.4. Variations of Attachment of Shape Variation Members

Figure 10:
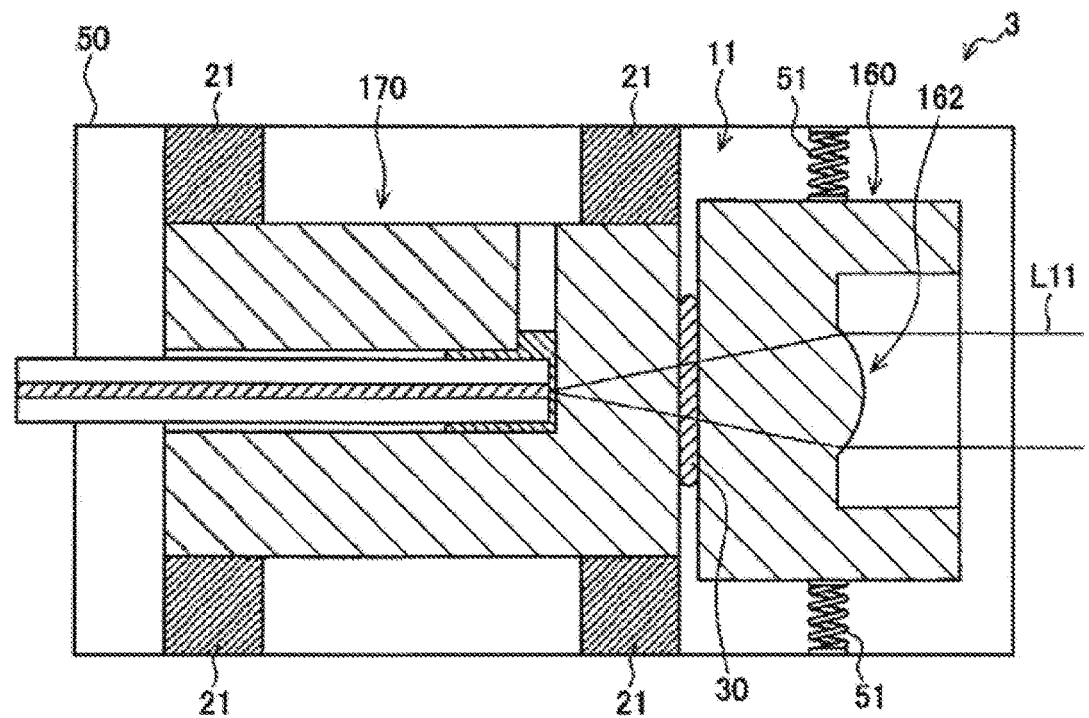
FIG. 10 is a diagram illustrating a variation of attachment of each shape variation member.
Figure 11:
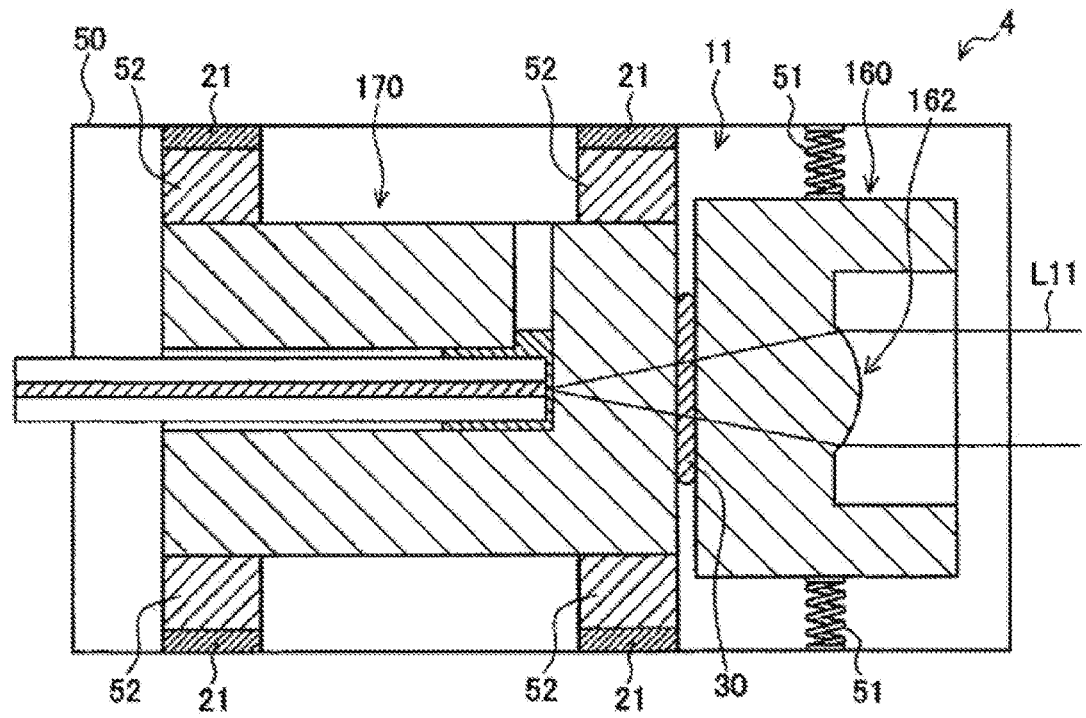
FIG. 11 is a diagram illustrating a variation of attachment of each shape variation member.
Figure 12:
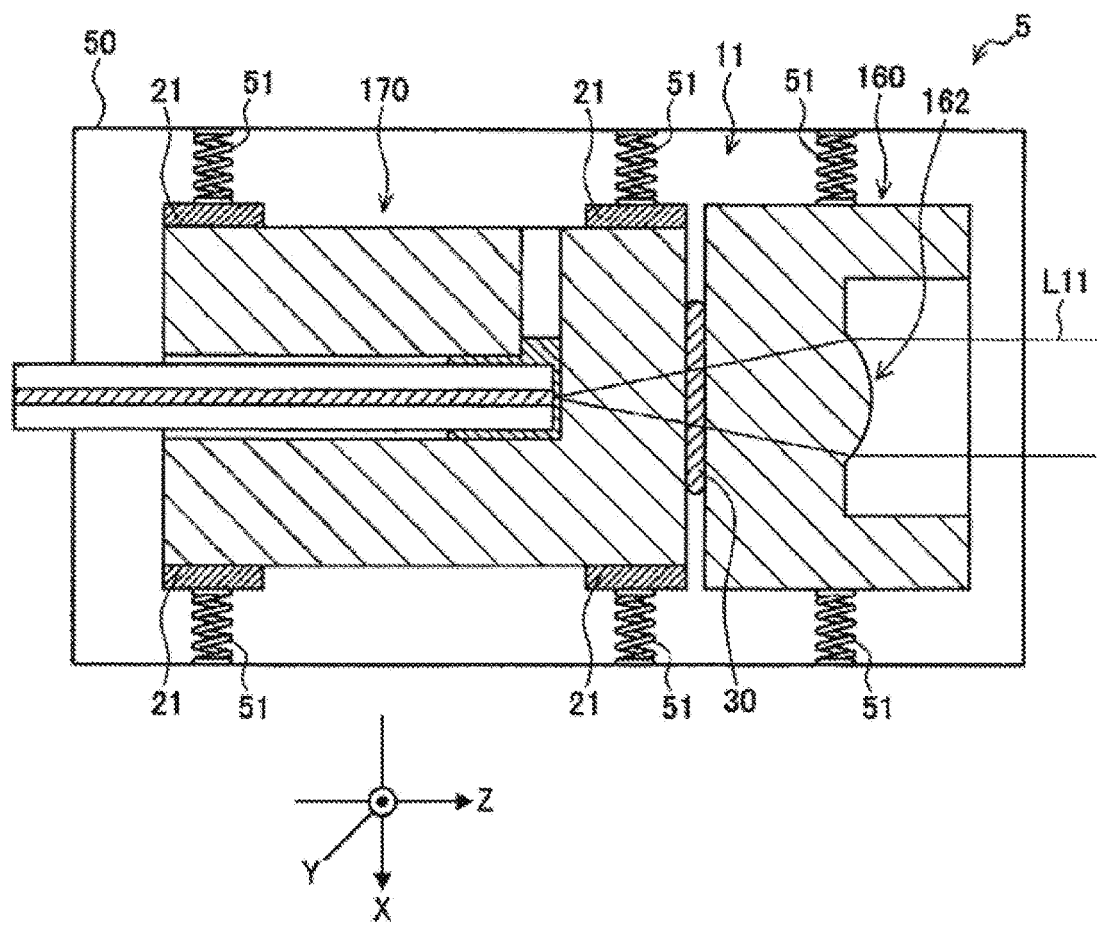
FIG. 12 is a diagram illustrating a variation of attachment of each shape variation member.

Various variations are assumable for attachment of each of the shape variation members 21. FIGS. 10 to 12 are each a diagram illustrating a variation of the attachment of each of the shape variation members 21. In these variations, the position of an inner part (the ferrule 170) is controlled with respect to the connector outer member 50.

Referring to FIG. 10, an optical communication connector 3 with an outer member includes the optical communication connector 11, the connector outer member 50, the eight shape variation members 21 (the shape variation members 21 provided by four on each of the closer and farther sides of the paper plane), and two elastic bodies 51. In this example, the connector outer member 50 and the ferrule 170 are directly coupled to each of the shape variation members 21. In such a case, there is a possibility that the ferrule 170 is influenced by accuracy of the connector outer member 50, vibration of the connector outer member 50, or the like. In contrast, because the with-lens light transmitting member 160 is coupled to the connector outer member 50 by the elastic body 51, there is a possibility that the with-lens light transmitting member 160 does not influenced by the accuracy of the connector outer member 50 or the vibration of the connector outer member 50, allowing for a shift of an axis of the fiber and causing degradation of the communication quality.

Referring to FIG. 11, an optical communication connector 4 with an outer member further includes eight pedestals 52 (the pedestals 52 provided by four on each of the closer and farther sides of the paper plane), unlike the optical communication connector 3 with the outer member illustrated in FIG. 10. Each of the pedestals 52 is sandwiched between the shape variation member 21 and the ferrule 170. With such a configuration, even in a case where a size of the shape variation member 21 is limited, etc., it is possible to adjust a space between the connector outer member 50 and the shape variation member 21. The number of the shape variation members 21 and the number of the pedestals 52 may not necessarily be the same. For example, one pedestal 52 may be provided for two or more shape variation members 21.

A material of each of the pedestals 52 is not limited. For example, each of the pedestals 52 may be configured to include a simple member such as metal or resin, or may be configured to include something having a particular function such as MEMS (Micro Electro Mechanical Systems). In a case where each of the pedestals 52 includes the MEMS, each of the pedestal 52 is combined with the shape variation member 21 to allow for more accurate alignment.

Referring to FIG. 12, an optical communication connector 5 with an outer member includes the elastic body 51 sandwiched between the connector outer member 50 and each of the shape variation members 21, unlike the optical communication connector 3 with the outer member illustrated in FIG. 10. With such a configuration, as compared with the optical communication connector 3 with the outer member illustrated in FIG. 10 and the optical communication connector 4 with the outer member illustrated in FIG. 11, strength of the floating of the ferrule 170 is further increased. Therefore, it is possible to increase resistance of the ferrule 170 to the influence of the vibration of the connector outer member 50, etc.

1.5. Variations of Attachment Positions of Shape Variation Members

Figure 13:
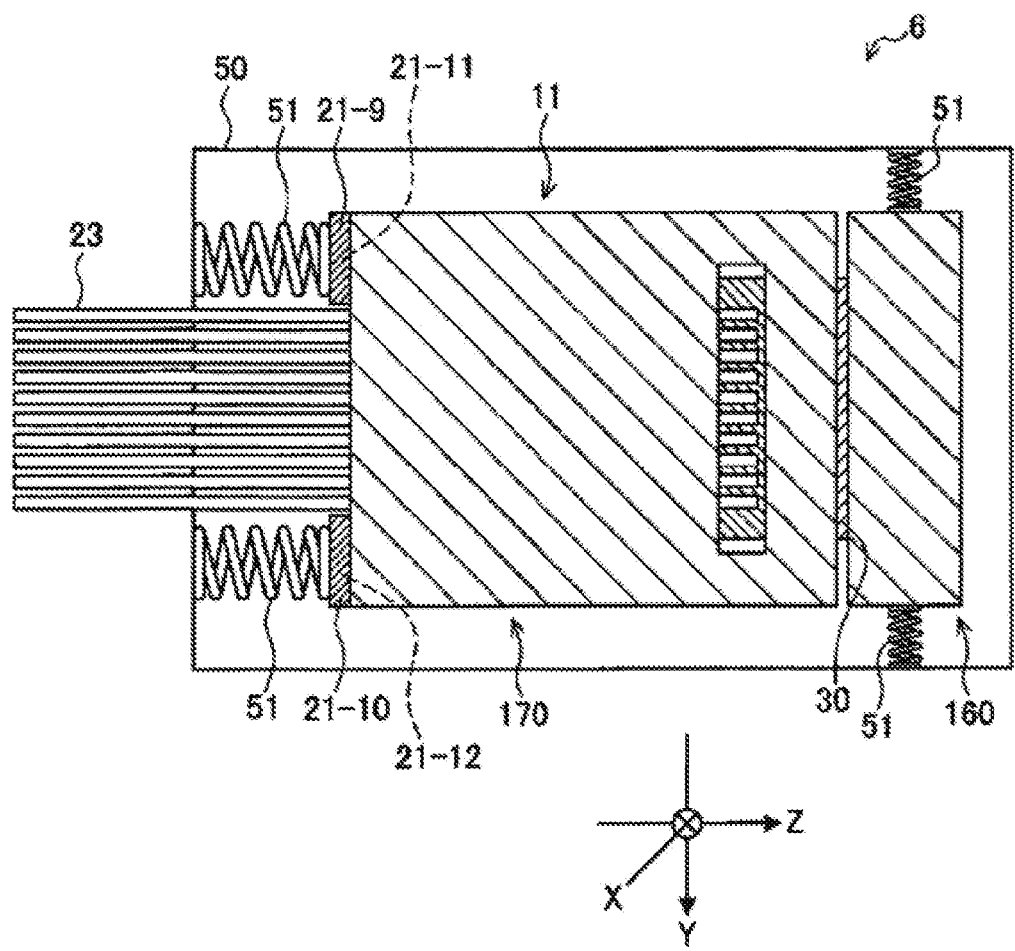
FIG. 13 is a diagram illustrating a variation of an attachment position of each shape variation member.
Figure 14:
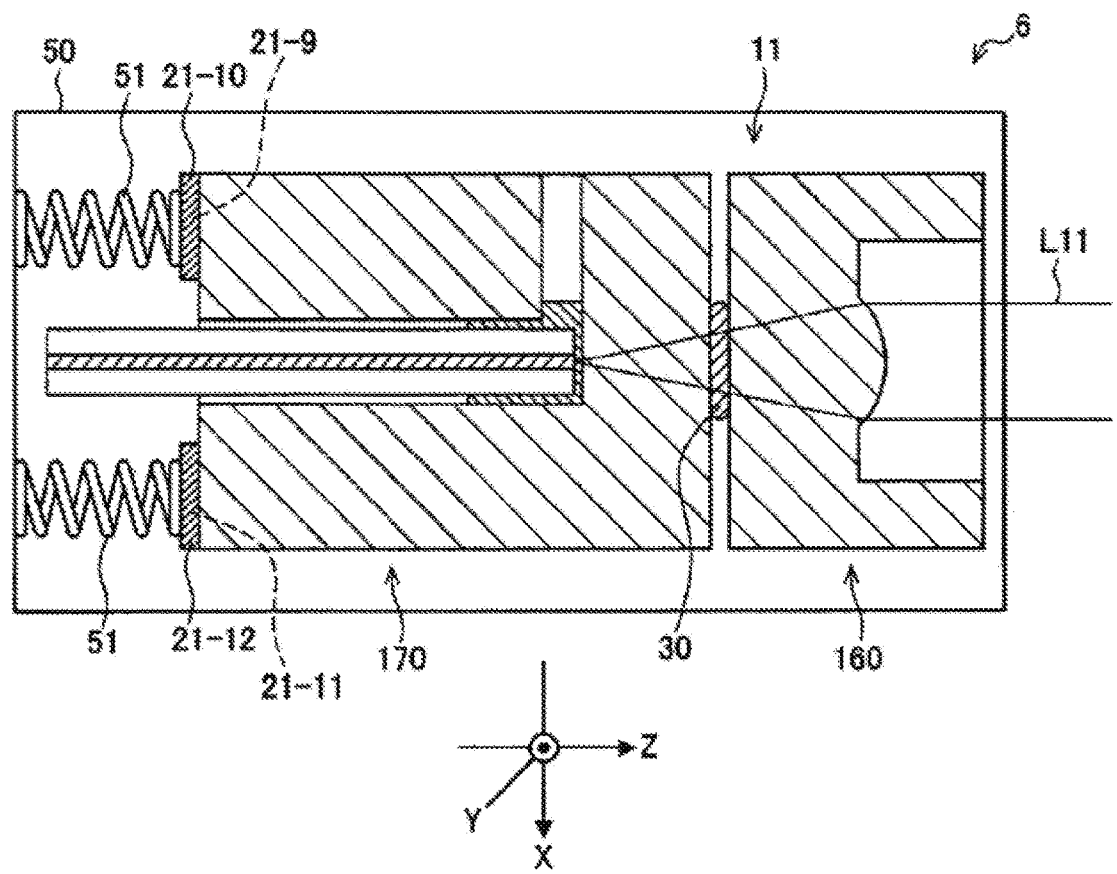
FIG. 14 is a diagram illustrating a variation of the attachment position of each shape variation member.

Various variations are assumable for attachment positions of the respective shape variation members 21. FIGS. 13 to 23 are each a diagram illustrating a variation of the attachment positions of the respective shape variation members 21. Referring to FIGS. 13 and 14, an optical communication connector 6 with an outer member includes shape variation members 21-9 to 21-12 coupled to a surface orthogonal to the axial direction of the fiber (in FIG. 13, a surface, of the ferrule 170, opposite from the with-lens light transmitting member 160), unlike the optical communication connector 5 with the outer member illustrated in FIG. 12. Note that, as with the example illustrated in FIG. 10, the connector outer member 50 and the ferrule 170 may be directly coupled to each of the shape variation members 21, or may be indirectly coupled to each of the shape variation members 21 with the pedestal 52 in between.

The control unit 42 is allowed to control the alignment of the ferrule 170 in the Z-axis direction (the axial direction of the fiber) by varying the shapes of the shape variation members 21-9 to 21-12. Further, the control unit 42 is allowed to control the alignment of the ferrule 170 in the X-axis rotational direction by varying the shapes of the shape variation members 21 (e.g., by varying the shapes of the shape variation members 21-9 and 21-11, or by varying the shapes of the shape variation members 21-10 and 21-12). Further, the control unit 42 is allowed to control the alignment of the ferrule 170 in the Y-axis rotational direction by varying the shapes of the shape variation members 21 (e.g., by varying the shapes of the shape variation members 21-9 and 21-10, or by varying the shapes of the shape variation members 21-11 and 21-12).

Figure 15:
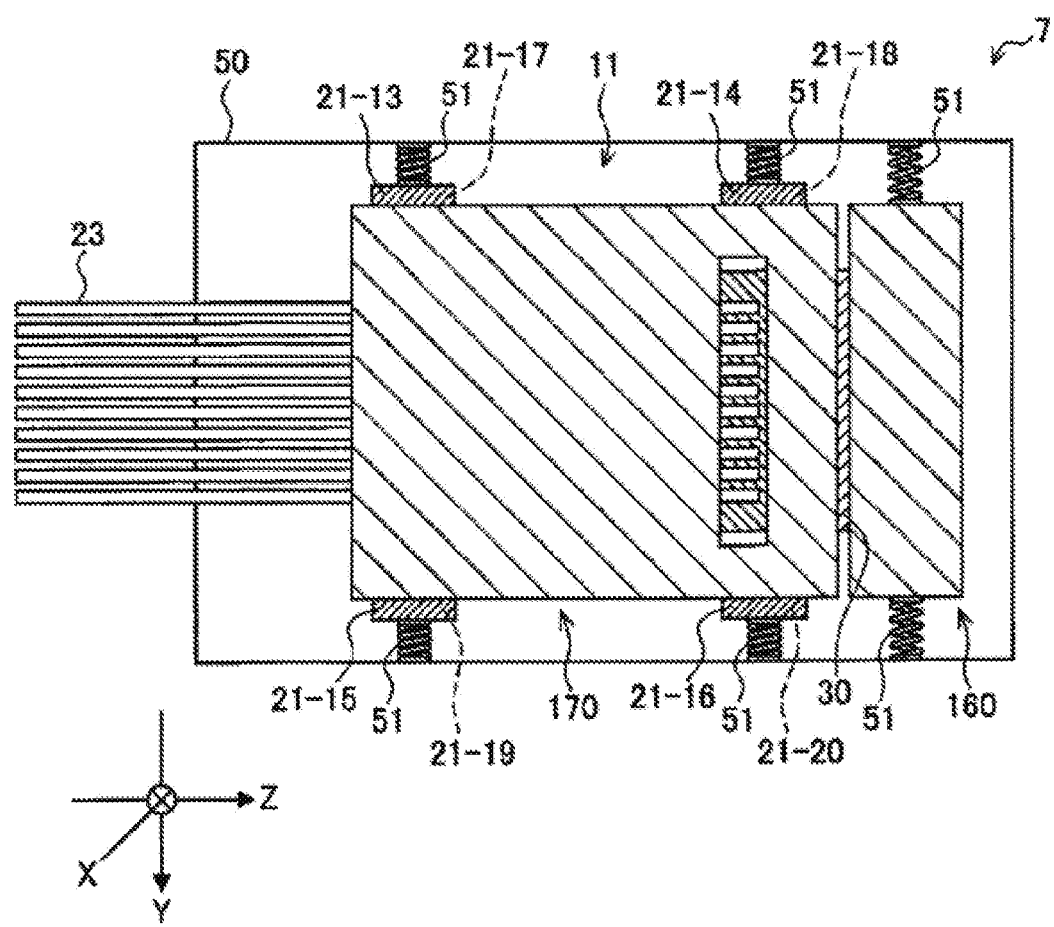
FIG. 15 is a diagram illustrating a variation of the attachment position of each shape variation member.

Referring to FIG. 15, an optical communication connector 7 with an outer member includes shape variation members 21-13 to 21-20 (the shape variation members 21-13 to 21-16 on the closer side of the paper plane and the shape variation members 21-17 to 21-20 on the farther side of the paper plane) coupled to a surface parallel to the axial direction of the fiber (in FIG. 15, the left and right surfaces of the ferrule 170). Note that, as with the example illustrated in FIG. 10, the connector outer member 50 and the ferrule 170 may be directly coupled to each of the shape variation members 21, or may be indirectly coupled to each of the shape variation members 21 with the pedestal 52 in between.

The control unit 42 is allowed to control alignment of the ferrule 170 in the Y-axis direction by varying the shapes of the shape variation members 21 (e.g., by varying the shapes of the shape variation members 21-13, 21-14, 21-17, and 21-18, or by varying the shapes of the shape variation members 21-15, 21-16, 21-19, and 21-20).

Further, the control unit 42 is allowed to control the alignment of the ferrule 170 in the X-axis rotational direction by varying the shapes of the shape variation members 21 (e.g., by varying the shapes of the shape variation members 21-14, 21-15, 21-18, and 21-19, or by varying the shapes of the shape variation members 21-13, 21-16, 21-17, and 21-20). Further, the control unit 42 is allowed to control the alignment of the ferrule 170 in the Z-axis rotational direction by varying the shapes of the shape variation members 21 (e.g., by varying the shapes of the shape variation members 21-13, 21-14, 21-19, and 21-20, or by varying the shapes of the shape variation members 21-15 to 21-18).

Figure 16:
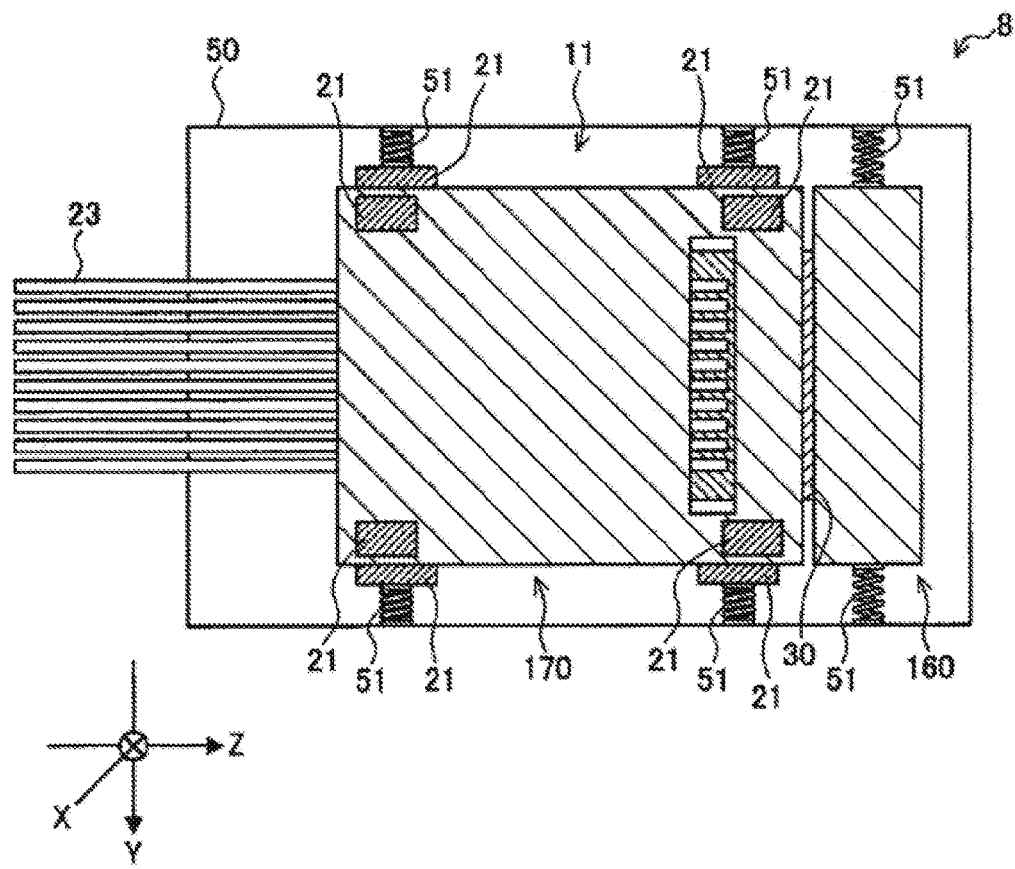
FIG. 16 is a diagram illustrating a variation of the attachment position of each shape variation member.

Referring to FIG. 16, each of the shape variation members 21 is coupled to any of four surfaces parallel to the axial direction of the fiber (left, right, upper, and lower surfaces of the ferrule 170). That is, an optical communication connector 8 with an outer member illustrated in FIG. 16 is an example in which the optical communication connector 1 with the outer member illustrated in FIG. 8 and the optical communication connector 7 with the outer member illustrated in FIG. 15 are integrated. This allows the control unit 42 to control the position of the ferrule 170 in each direction, as with the examples illustrated in FIGS. 8 and 15.

Figure 17:
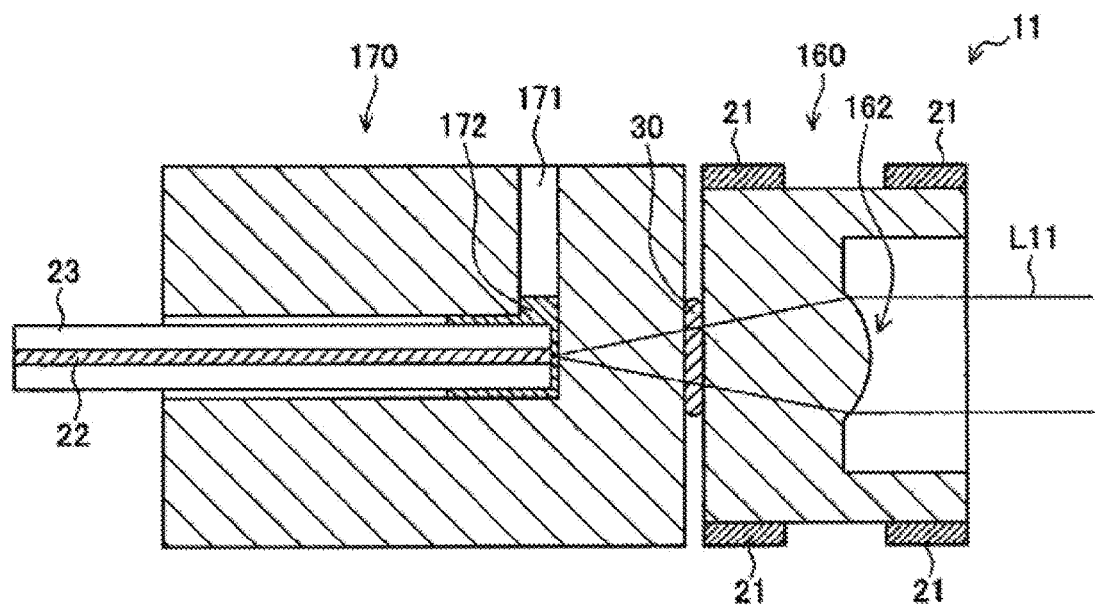
FIG. 17 is a diagram illustrating a variation of the attachment position of each shape variation member.
Figure 18:
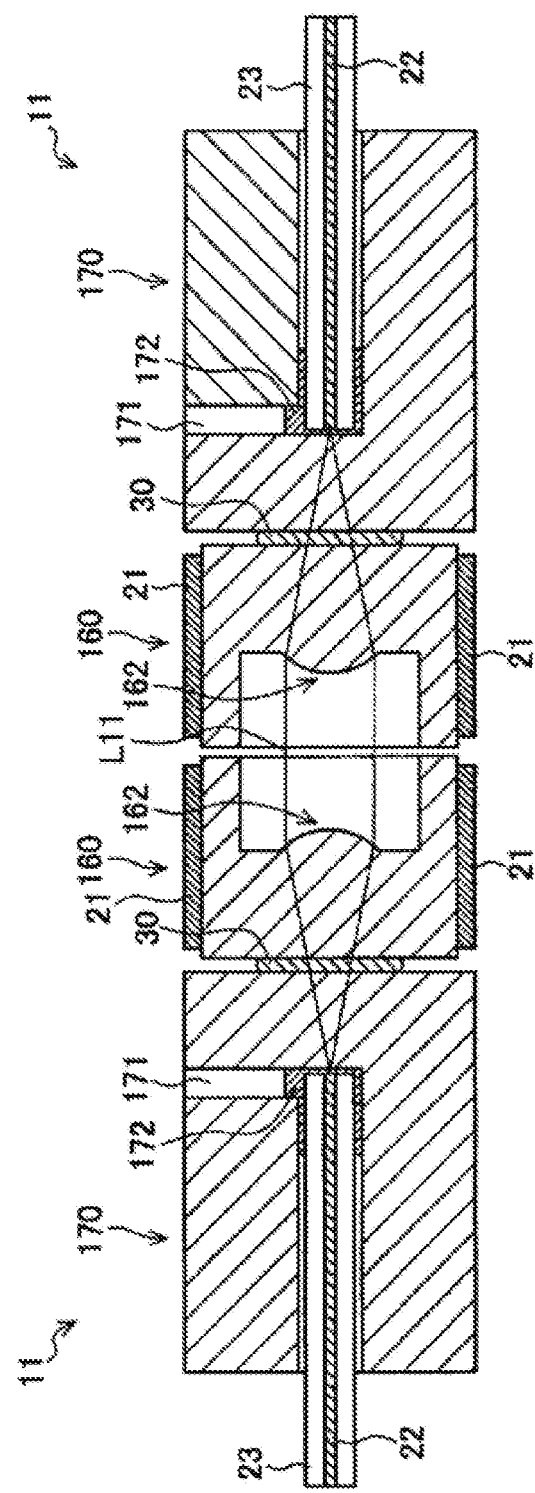
FIG. 18 is a diagram illustrating a variation of the attachment position of each shape variation member.
Figure 19:
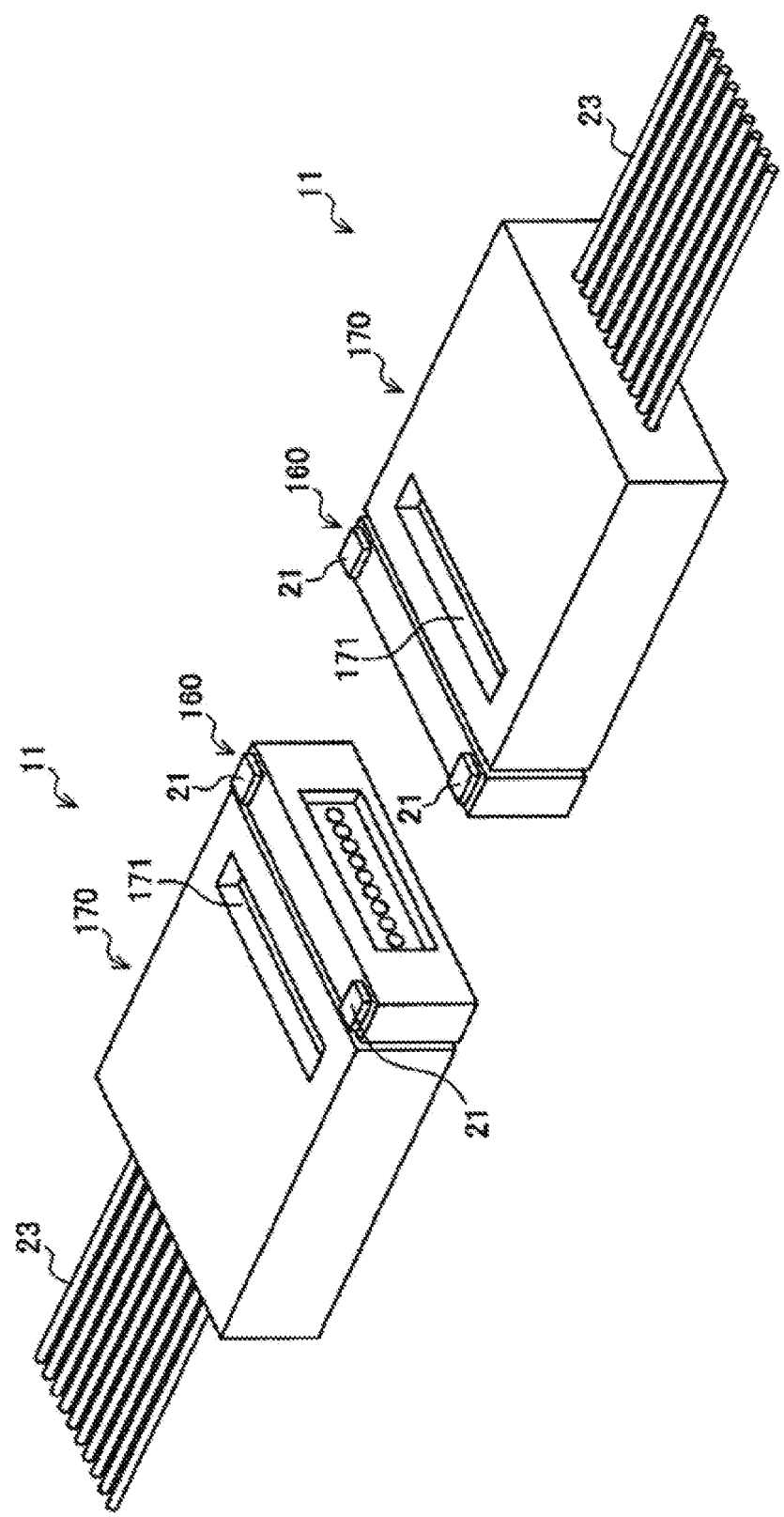
FIG. 19 is a diagram illustrating a variation of the attachment position of each shape variation member.

Referring to FIGS. 17 to 19, each of the shape variation members 21 is coupled to the with-lens light transmitting member 160 instead of the ferrule 170. That is, the control unit 42 controls the position of the with-lens light transmitting member 160 by varying the shapes of the shape variation members 21. Also in a case where each of the shape variation members 21 is coupled to the with-lens light transmitting member 160, as with the case where each of the shape variation members 21 is coupled to the ferrule 170, the number and the positions of the shape variation members 21 are not limited, and each of the shape variation members 21 may be coupled directly to the with-lens light transmitting member 160 or may be coupled indirectly to the with-lens light transmitting member 160 with another member in between.

The position of the with-lens light transmitting member 160 is allowed to be controlled by a method similar to that for the position of the ferrule 170. However, in a case where each of the shape variation members 21 is coupled to the with-lens light transmitting member 160, if the two with-lens light transmitting members 160 are fixed directly (e.g., as described with reference to FIG. 7, with use of the recesses 163-1 and the convexes 163-2, or with use of a pin, etc.) when positioning the two optical communication connectors 11, one of the with-lens light transmitting members 160 becomes unmovable with respect to the other of the with-lens light transmitting members 160.

Therefore, as illustrated in FIG. 18, it is necessary that the with-lens light transmitting members 160 are not fitted with each other and the two optical communication connectors 11 are so positioned that a space is present between the two with-lens light transmitting members 160. In this case, a positioning mechanism for the two optical communication connectors 11 may be provided on the connector outer part side although it is not illustrated. Further, in the examples illustrated in FIGS. 17 to 19, the shape variation members 21 are coupled only to the with-lens light transmitting member 160. However, the shape variation members 21 may be coupled also to the ferrule 170, and the positions of both of the with-lens light transmitting member 160 and the ferrule 170 may be controlled with use of the shape variation members 21.

Figure 20:
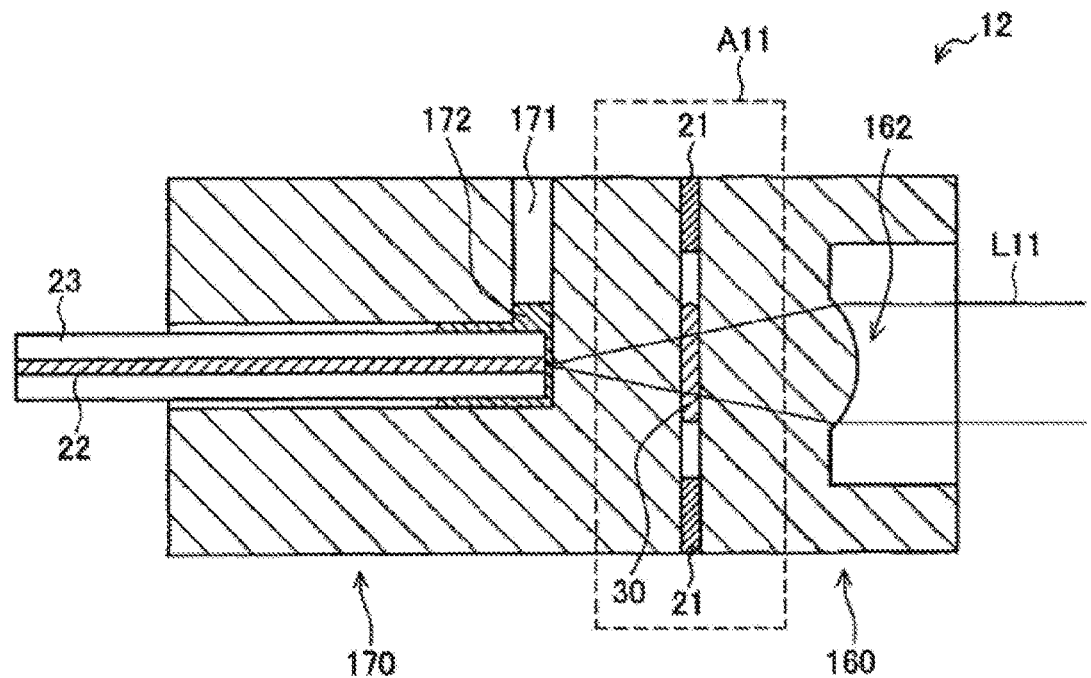
FIG. 20 is a diagram illustrating a variation of the attachment position of each shape variation member.

Referring to FIG. 20, an optical communication connector 12 includes the shape variation members 21 each coupled to a surface orthogonal to the axial direction of the fiber (in FIG. 20, the surface, of the ferrule 170, on the with-lens light transmitting member 160 side). More specifically, each of the shape variation members 21 is interposed between the ferrule 170 and the with-lens light transmitting member 160. Note that the ferrule 170 and the with-lens light transmitting member 160 may be directly coupled to each of the shape variation members 21, or may be indirectly coupled to each of the shape variation members 21 with another member in between.

Figure 21:
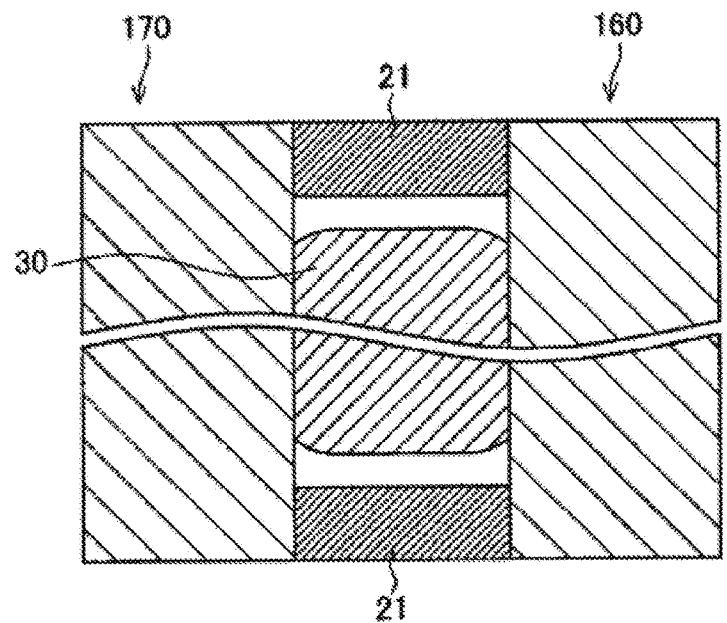
FIG. 21 is a diagram illustrating a variation of the attachment position of each shape variation member.
Figure 22:
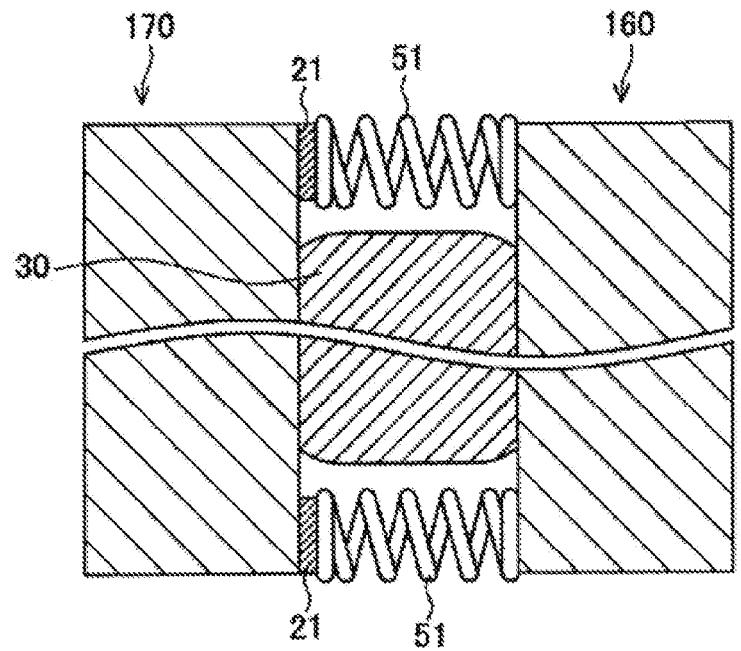
FIG. 22 is a diagram illustrating a variation of the attachment position of each shape variation member.

Referring to FIG. 21, illustrated is an enlarged view of a region A11 around a coupling part of the ferrule 170 and the with-lens light transmitting member 160. In this example, the ferrule 170 and the with-lens light transmitting member 160 are directly coupled to each of the shape variation members 21. Alternatively, as illustrated in FIG. 22, the ferrule 170 and the with-lens light transmitting member 160 may be indirectly coupled to each of the shape variation members 21 with the elastic body 51 (in FIG. 22, a spring) in between. By providing the elastic body 51, even in a case where the shape of the shape variation member 21 is limited, etc., a structural condition imposed by such limitation is allowed to be reduced.

Figure 23:
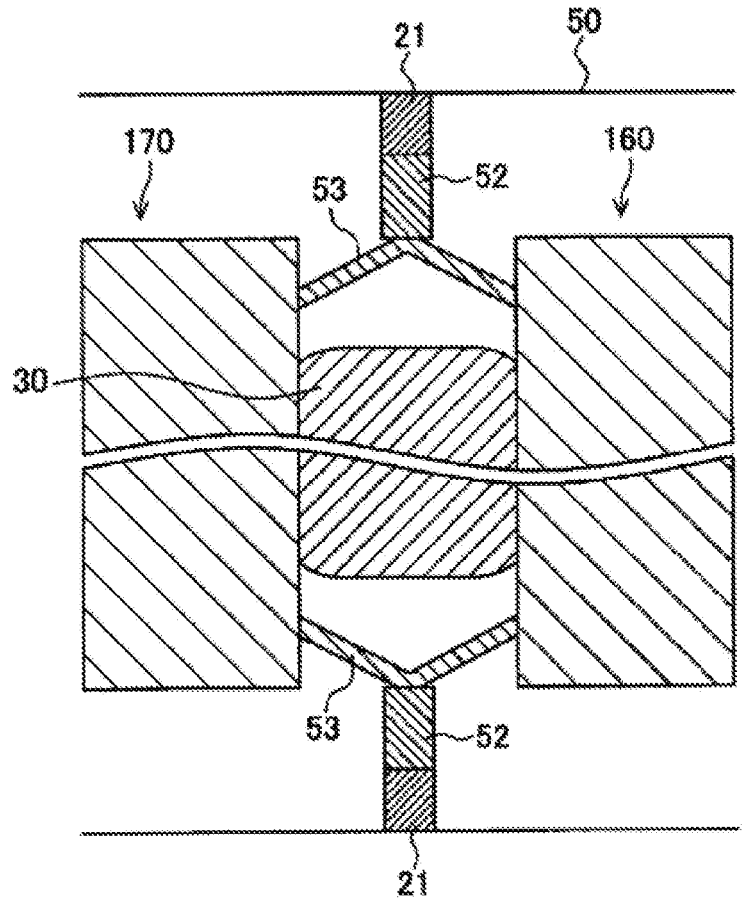
FIG. 23 is a diagram illustrating a variation of the attachment position of each shape variation member.

Referring to FIG. 23, the ferrule 170 and the with-lens light transmitting member 160 may be indirectly coupled to each of the shape variation members 21 with a leaf spring 53 in between. Pressing the leaf spring 53 from the top (or from the bottom) allows for an increase or a decrease in a distance between the ferrule 170 and the with-lens light transmitting member 160. On this occasion, the leaf spring 53 may be pressed directly by the shape variation member 21, or may be pressed indirectly with the pedestal 52 in between as illustrated in FIG. 23. As described above, although the material of the pedestal 52 is not limited, if the pedestal 52 is configured to include something having a particular function such as the MEMS, a length of the leaf spring 53 is allowed to be adjusted with higher accuracy.

1.6. Use of Light Transmissive Shape Variation Material

Figure 24:
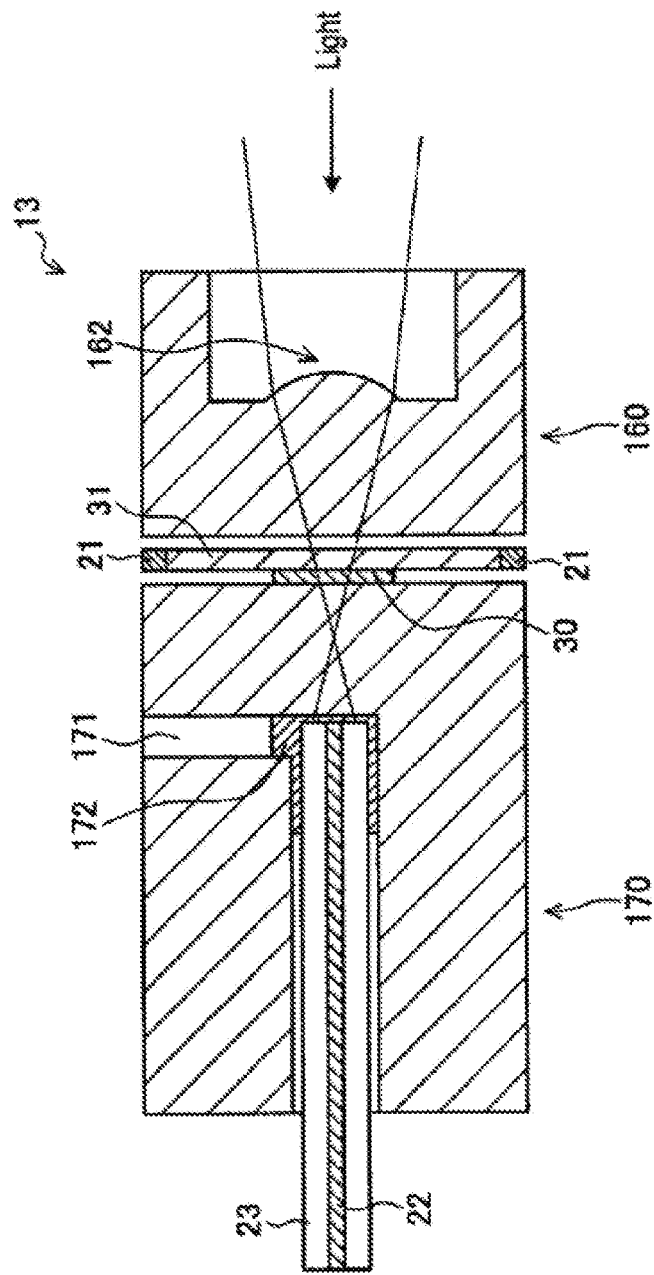
FIG. 24 is a diagram illustrating an example in which a light transmissive shape varying material is used.
Figure 25:
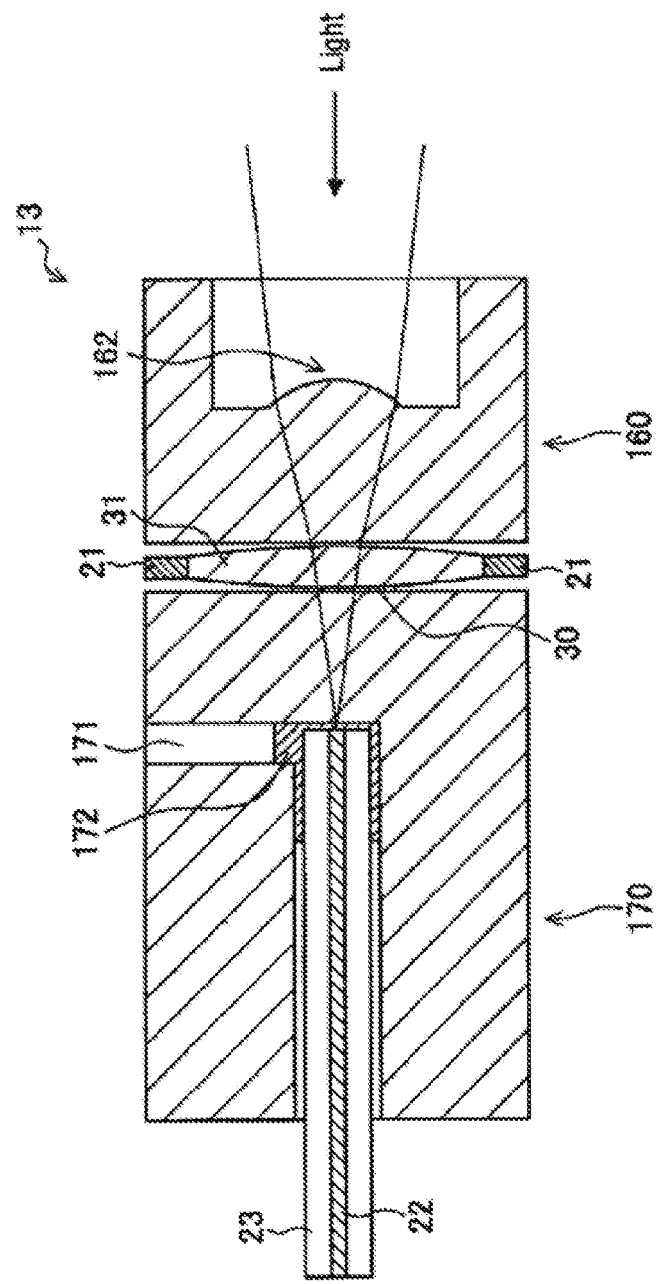
FIG. 25 is a diagram illustrating an example in which the light transmissive shape varying material is used.

Next, examples of using a light transmissive shape variation material is described. FIGS. 24 and 25 are each a diagram illustrating an example of using the light transmissive shape variation material.

Referring to FIG. 24, an optical communication connector 13 includes the ferrule 170 and the with-lens light transmitting member 160, and a light transmissive shape variation material 31 is sandwiched between the ferrule 170 and the with-lens light transmitting member 160. A material of the light transmissive shape variation material 31 is not limited, but the light transmissive shape variation material 31 may be configured of a glass film, or may be configured of a liquid lens. Further, each of the shape variation members 21 is coupled to the light transmissive shape variation material 31.

A shape of the light transmissive shape variation material 31 varies in accordance with a pressure applied from outside. Thus, as illustrated in FIG. 25, when the control unit 42 varies the shape of each of the shape variation members 21, a pressure is applied to the light transmissive shape variation material 31 from each of the shape variation members 21. Therefore, the shape of the light transmissive shape variation material 31 also varies. As illustrated in FIG. 25, the light transmissive material 30 is interposed between the light transmissive shape variation material 31 and the ferrule 170, and a space is provided between the light transmissive material 30 and the with-lens light transmitting member 160, whereby a convex lens is formed between the light transmissive shape variation material 31 and the with-lens light transmitting member 160.

That is, the control unit 42 is allowed to vary (control) a path of light (an optical path) by varying (controlling) a shape of this convex lens (by varying the shape of each of the shape variation members 21 and the light transmissive shape variation material 31). This allows the control unit 42 to control a position of a light collection point (to control alignment) to thereby increase a rate of light collection to the core 22 of the fiber 23. Referring to FIG. 24, the rate of the light collection to the core 22 of the fiber 23 is low, but referring to FIG. 25, as a consequence of the variation of the optical path, the rate of the light collection to the core 22 of the fiber 23 is increased.

Figure 26:
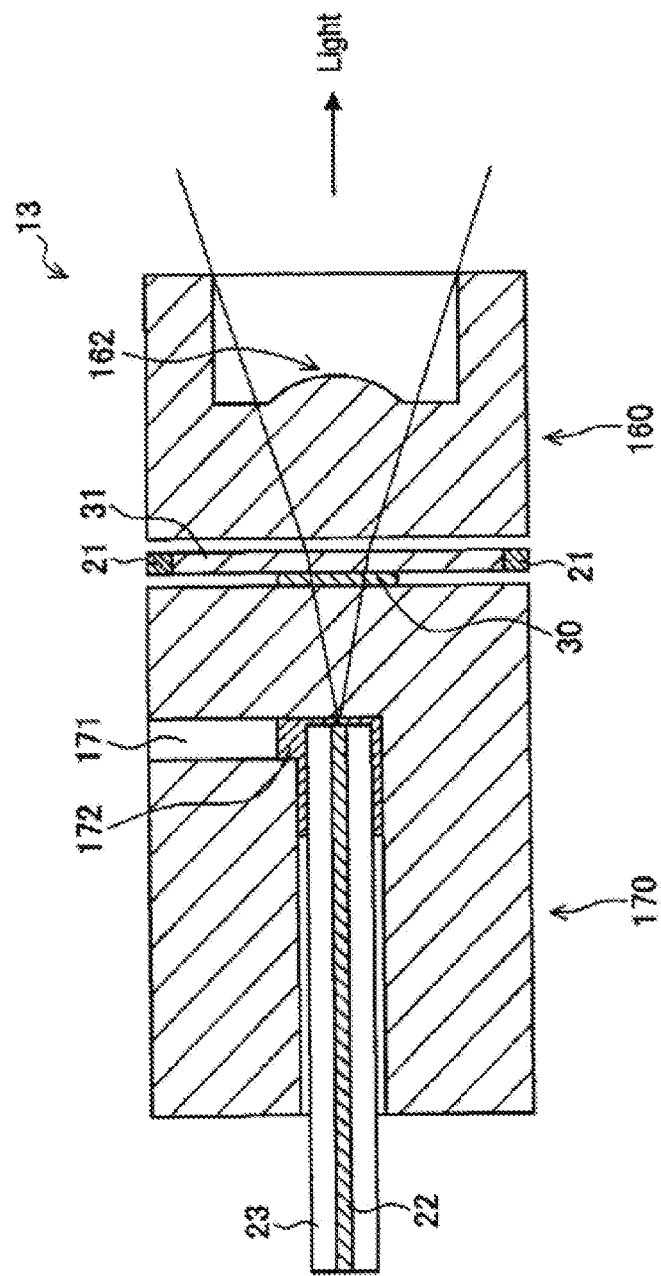
FIG. 26 is a diagram illustrating an example in which the light transmissive shape varying material is used.
Figure 27:
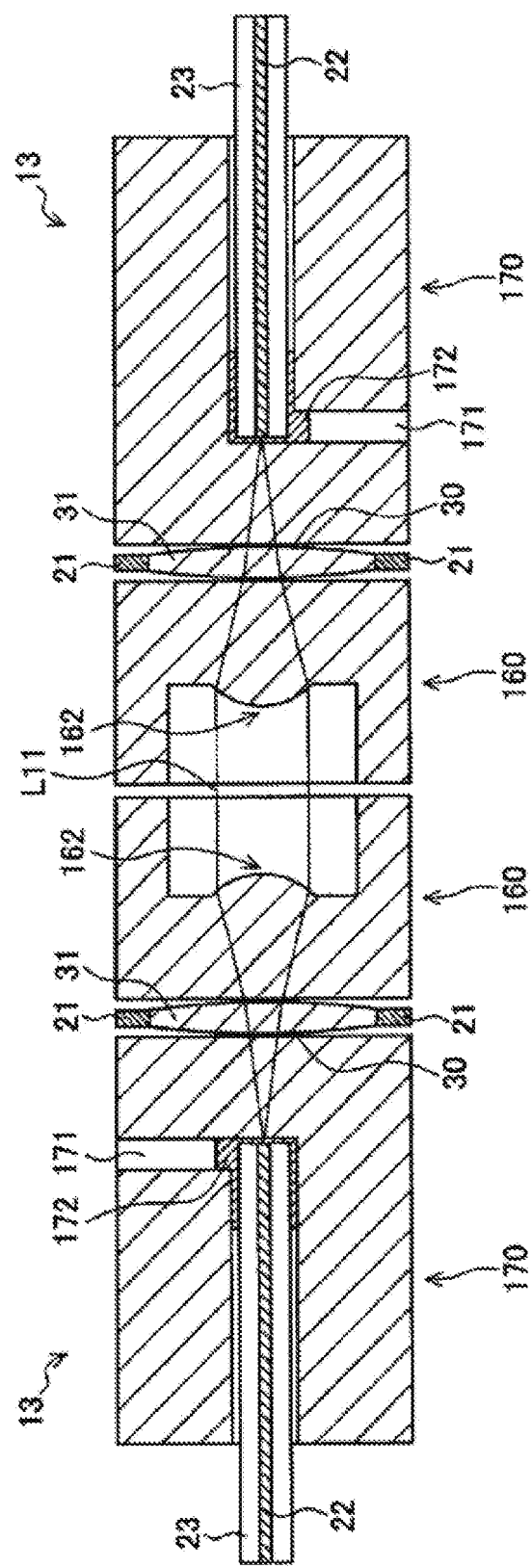
FIG. 27 is a diagram illustrating an example in which the light transmissive shape varying material is used.

In the above, an example of controlling the light transmissive shape variation material (a convex lens shape) to increase the rate of the light collection to the core of the fiber on the light receiving side (the receiving side) has been described. However, it is also possible to generate a desired collimated light by controlling the light transmissive shape variation material (the convex lens shape) on the light emitting side (the transmitting side). FIGS. 26 and 27 are each a diagram illustrating an example of using the light transmissive shape variation material.

Referring to FIG. 26, the optical communication connector 13 at the time of not being fitted (to another optical communication connector) is illustrated. At the time when the optical communication connector 13 is not fitted, because it is prior to variation of the shapes of the shape variation members 21 and the light transmissive shape variation material 31, the convex lens is not formed yet and light outputted from the fiber 23 is diffused. At this time, it is desirable that a power amount of the light outputted from the optical communication connector 13 be attenuated to an amount of optical power satisfying Eye Safety standard.

Referring to FIG. 27, two optical communication connectors 13 fitted with each other are illustrated. When the optical communication connector 13 is fitted, the control unit 42 varies the shapes of the shape variation members 21 and the light transmissive shape variation material 31 to form the convex lens. As a result, the path (the optical path) of the light is varied. Therefore, the light outputted from the fiber 23 is transmitted via the convex lens (e.g., as the collimated light L11). This makes it possible to ensure the amount of power of the communicable light. Note that the light outputted from the fiber 23 may not necessarily be turned into the collimated light L11 by the convex lens, and it is sufficient that the light outputted from the fiber 23 is shaped into light of a predetermined shape (e.g., light having a directivity angle smaller than that at the time of non-fitting).

Further, the control unit 42 may detect a fitted state of the optical communication connector 13 (whether it is the time of being fitted or the time of not being fitted) in any way. For example, in a case where an electrode is provided to the connector outer member 50, the control unit 42 is allowed to detect whether it is the time of being fitted or the time of not being fitted on the basis of whether or not the electrode is conducted.

Figure 28:
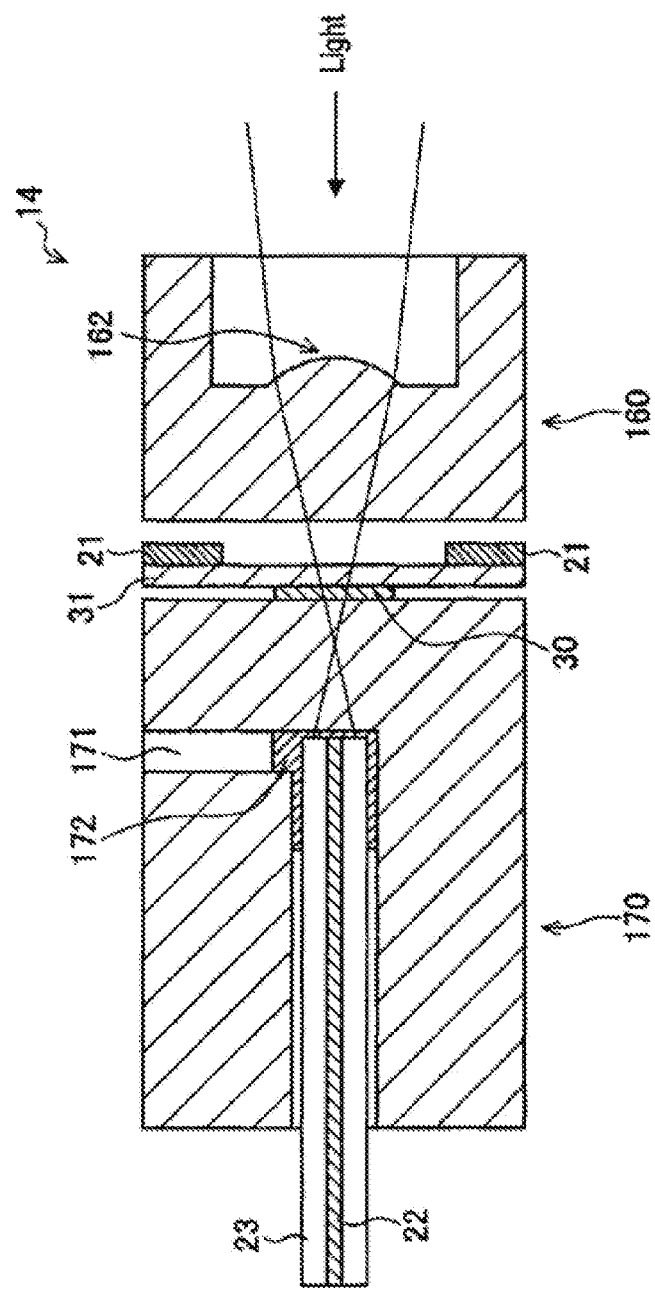
FIG. 28 is a diagram illustrating an example in which the light transmissive shape varying material is used.
Figure 29:
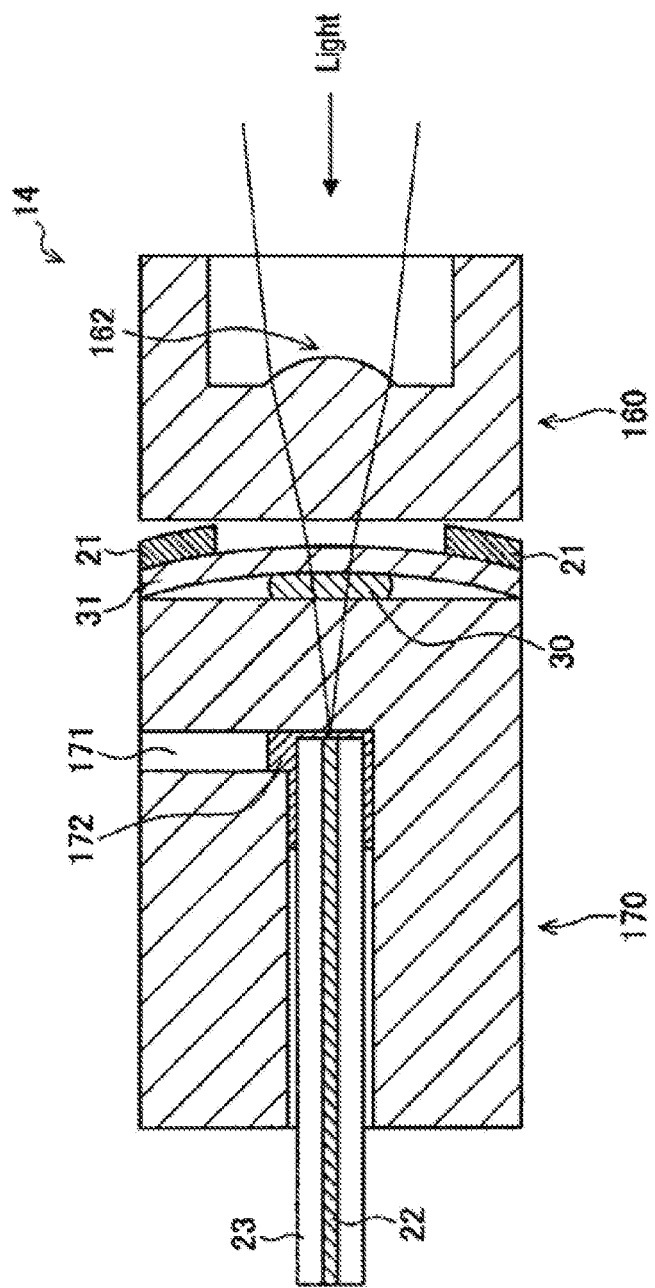
FIG. 29 is a diagram illustrating an example in which the light transmissive shape varying material is used.

FIGS. 28 and 29 are each a diagram illustrating an example of using the light transmissive shape variation material. In more detail, they correspond to modifications of the examples of using the light transmissive shape variation material illustrated in FIGS. 24 and 25. Referring to FIG. 28, as in the example illustrated in FIG. 24, an optical communication connector 14 includes the ferrule 170 and the with-lens light transmitting member 160, and the light transmissive shape variation material 31 is sandwiched between the ferrule 170 and the with-lens light transmitting member 160. Further, each of the shape variation members 21 is coupled to the light transmissive shape variation material 31. In the example illustrated in FIG. 28, the position of each of the shape variation members 21 is different, compared with the example illustrated in FIG. 24.

Referring to FIG. 29, the shapes of the shape variation members 21 and the light transmissive shape variation material 31 are varied. In the example illustrated in FIG. 29, the shape of each of the shape variation members 21 after the shape variation is different, as compared with the example illustrated in FIG. 25. Further, in the example illustrated in FIG. 29, the shape of the light transmissive shape variation material 31 after the shape variation is different, as compared with the example illustrated in FIG. 25.

1.7. Use of Mirror

Figure 30:
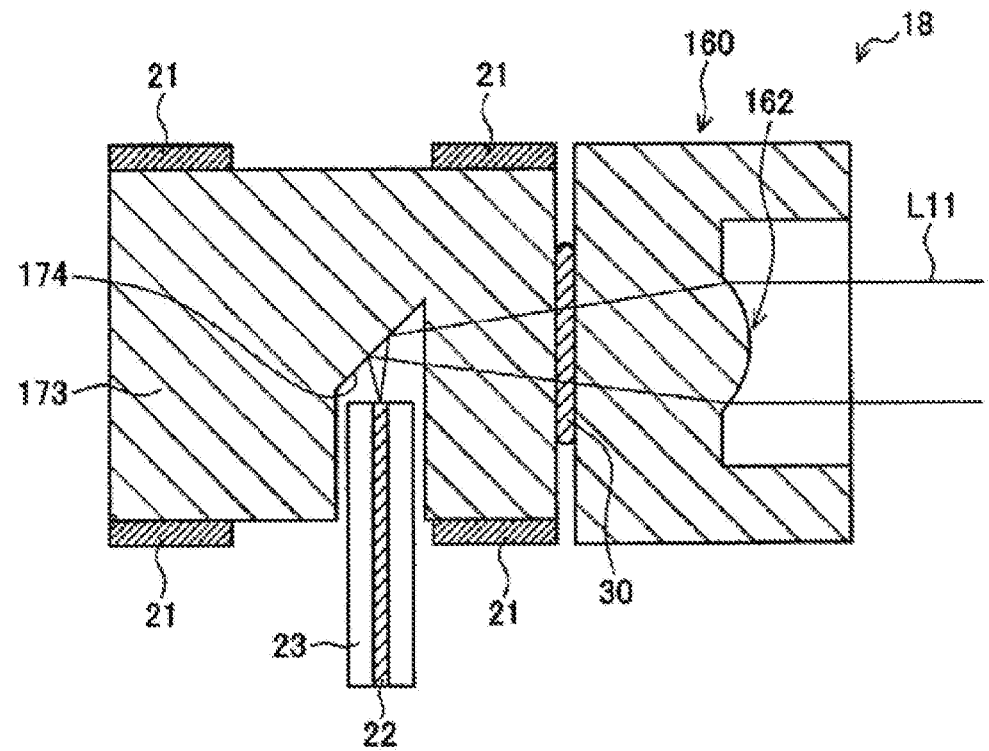
FIG. 30 is a diagram illustrating an example in which a mirror is used.

Next, an example of using a mirror is described. FIG. 30 is a diagram illustrating an example of using the mirror.

Referring to FIG. 30, an optical communication connector 18 includes a ferrule 173 and the with-lens light transmitting member 160, and a mirror 174 is provided inside the ferrule 173. A direction of light outputted from the fiber 23 is varied by the mirror 174 and the light is caused to enter the lens 162. Meanwhile, a direction of the light outputted from the lens 162 is varied by the mirror 174 and the light is caused to enter the fiber 23. Thus, because the position of the fiber 23 is allowed to be changed as appropriate, it is possible to increase a degree of freedom in designing.

In the above, the first embodiment of the present disclosure has been described.

2. SECOND EMBODIMENT

Hereinafter, a second embodiment of the present disclosure is described.

2.1. Configuration Examples of Optical Communication Connector

Next, a configuration example of an optical communication connector according to the second embodiment of the present disclosure is described. In the first embodiment of the present disclosure, mainly described is an example in which the alignment of the fiber 23 and the lens 162 is controlled. In the second embodiment of the present disclosure, mainly described is a case where an optical device is used in place of the fiber 23. Other configurations are similar between the first embodiment of the present disclosure and the second embodiment of the present disclosure. That is, alignment of the optical device and the lens 162 is also allowed to be controlled by a method similar to that of the alignment of the fiber 23 and the lens 162.

A specific configuration of the optical device is not limited. For example, the optical device may be a VCSEL (Vertical Cavity Surface Emitting Laser) or a PD (Photo-Diode).

Figure 31:
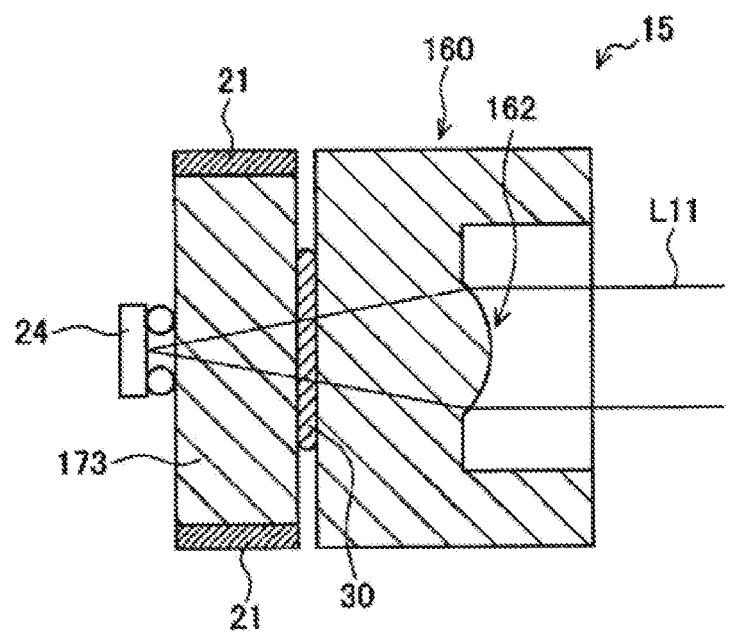
FIG. 31 is a diagram illustrating a configuration example of an optical communication connector according to a second embodiment of the present disclosure.
Figure 32:
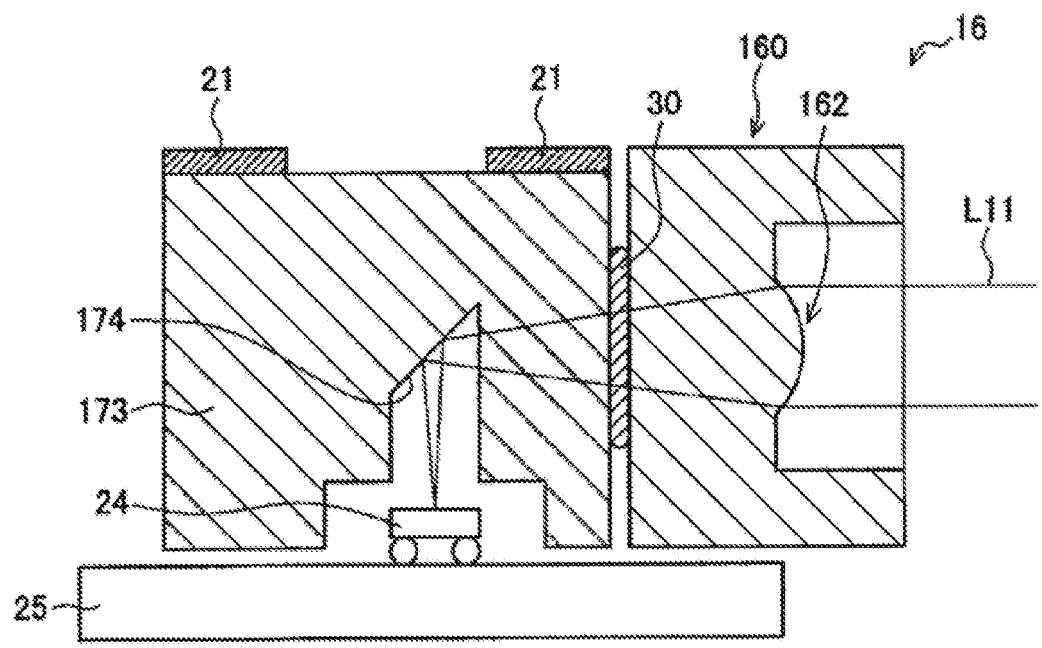
FIG. 32 is a diagram illustrating a configuration example of the optical communication connector according to the same embodiment.
Figure 33:
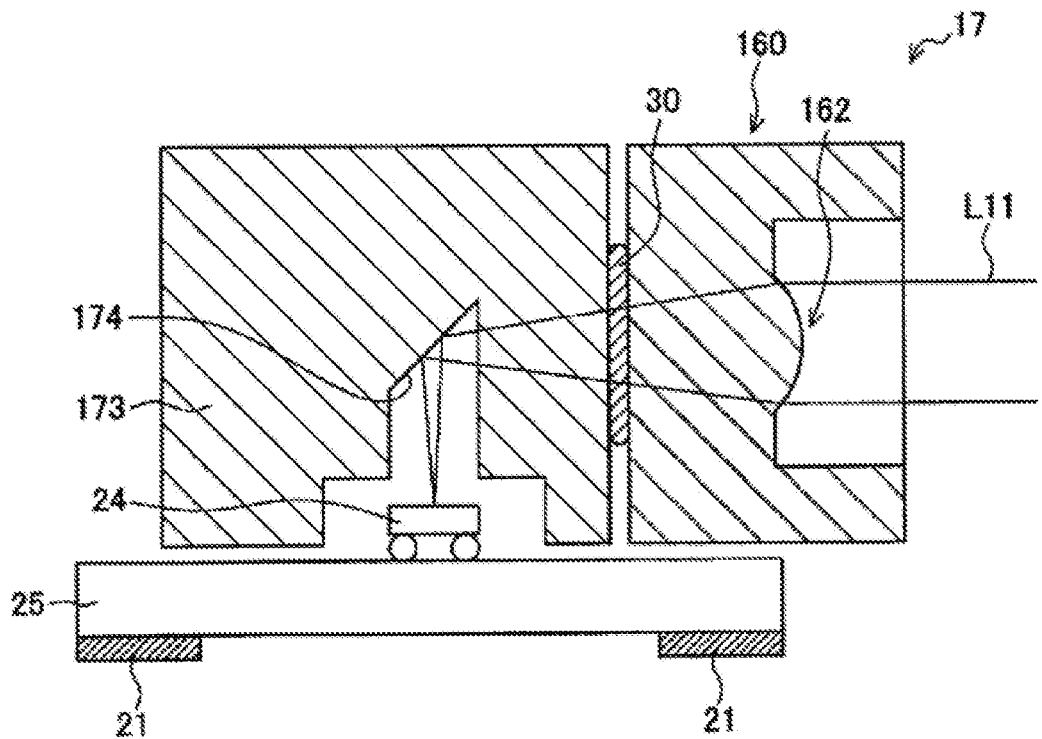
FIG. 33 is a diagram illustrating a configuration example of the optical communication connector according to the same embodiment.

FIGS. 31 to 33 are each a diagram illustrating a configuration example of the optical communication connector according to the second embodiment of the present disclosure. Referring to FIG. 31, in an optical communication connector 15 according to the second embodiment of the present disclosure, an optical device 24 is used instead of the fiber 23. As with the first embodiment of the present disclosure, a control unit according to the second embodiment of the present disclosure controls alignment of the optical device 24 and the lens 162 by varying the shape of each of the shape variation members 21 on the basis of the communication quality of the light reaching the optical device 24 via the lens 162.

Further, referring to FIG. 32, in an optical communication connector 16, the mirror 174 is provided inside the ferrule 173. This allows a position of the optical device 24 to be varied as appropriate. Therefore, it is possible to increase a degree of freedom in designing. For example, as illustrated in FIG. 32, the optical device 24 is allowed to be provided on a substrate 25. Further, as illustrated in FIG. 33, each of the shape variation members 21 is allowed to be coupled to the substrate 25.

In the above, the second embodiment of the present disclosure has been described.

3. THIRD EMBODIMENT

Hereinafter, a third embodiment of the present disclosure is described.

3.1. Configuration Example of Optical Communication Connector

Next, a configuration example of an optical communication connector according to the third embodiment of the present disclosure is described. In the first embodiment of the present disclosure, mainly described is an example in which the alignment of the fiber 23 and the lens 162 is controlled. In the third embodiment of the present disclosure, a case where the optical communication connector is also applied to a PC-type connector (e.g., an MT (Mechanically Transferable) connector, etc.) is mainly described. Other configurations are similar between the first embodiment of the present disclosure and the third embodiment of the present disclosure. That is, alignment of the fiber 23 and the fiber 23 is also allowed to be controlled by a method similar to that of the alignment of the fiber 23 and the lens 162.

Figure 34:
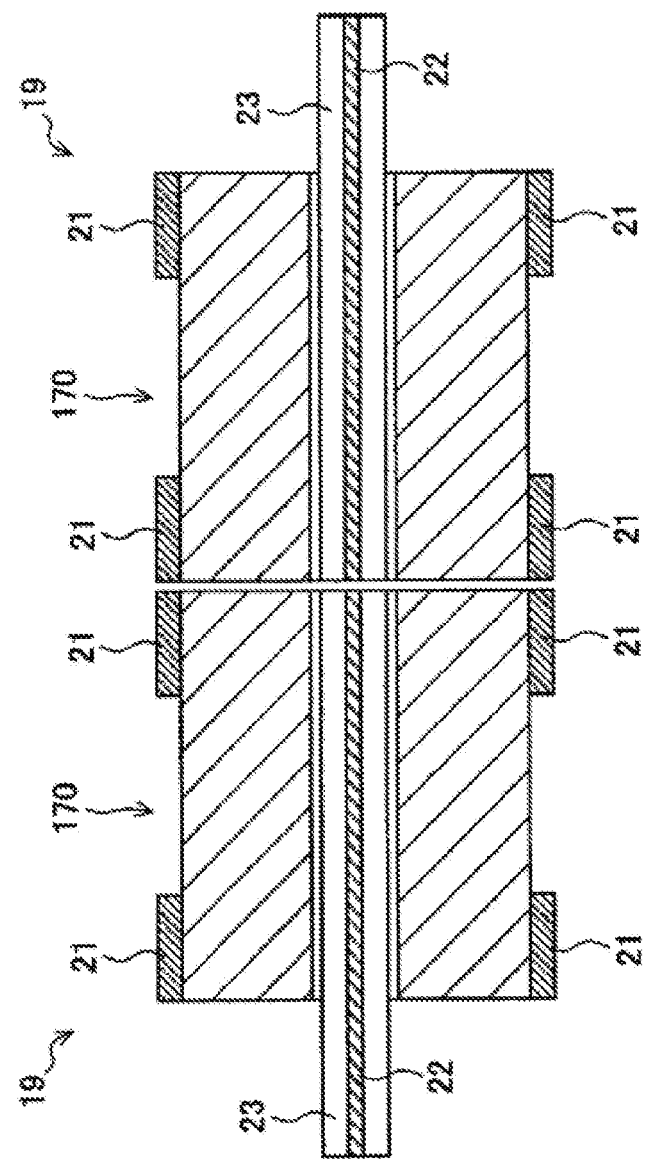
FIG. 34 is a diagram illustrating a configuration example of an optical communication connector according to a third embodiment of the present disclosure.

FIG. 34 illustrates a configuration example of the optical communication connector according to the third embodiment of the present disclosure. Referring to FIG. 34, in the third embodiment of the present disclosure, one optical communication connector 19 includes the ferrule 170 (a first ferrule), and the fiber 23 (a first fiber) is fixed to the ferrule 170 (the first ferrule). The other optical communication connector 19 includes the ferrule 170 (a second ferrule), and the fiber 23 (a second fiber) is fixed to the ferrule 170 (the second ferrule).

As with the first embodiment of the present disclosure, a control unit according to the third embodiment of the present disclosure controls alignment of the ferrule 170 (the second ferrule) and the ferrule 170 (the second ferrule) by varying the shape of each of the shape variation members 21 (on the other fiber 23 side) on the basis of the communication quality of the light entering the other fiber 23 (the first fiber) via the one fiber 23 (the second fiber).

In the above, the third embodiment of the present disclosure has been described.

4. MODIFICATIONS

In the above, preferred embodiments of the present disclosure have been described in detail with reference to the accompanying drawings, but the technical scope of the present disclosure is not limited to such examples. A person having ordinary knowledge in the technical field is able to find various alterations and modifications within the scope of the technical idea described in the claims, and it should be understood that they will naturally belong to the technical scope of the present disclosure.

For example, in the above, the optical communication connector including the ferrule 170 and the lens 162 has been mainly described. Further, the example in which the alignment of the ferrule 170 and the lens 162 is controlled by the control unit 42 has been mainly described. However, the technique of alignment according to each of the embodiments of the present disclosure is also applicable to other than the optical communication connector. The technique of alignment according to each of the embodiments of the present disclosure is also applicable to an optical communication apparatus. That is, the control unit 42 is also able to provide an optical communication apparatus that varies the shape of the shape variation member 21 on the basis of the communication quality of the light entering the fiber 23 via the lens 162 to control alignment.

Further, the ferrule 170 may be configured to include a member that transmits light (e.g., resin, glass, or the like). Alternatively, in a case where light at a wavelength that is transmitted through Silicon is used, the ferrule 170 may be configured to include a Silicon material such as the MEMS. Similarly, the with-glass light transmitting member 160 may be configured to include a member that transmits light, or may be configured to include a Silicon material such as the MEMS in the case where the light at the wavelength that is transmitted through Silicon is used.

As described above, the technique according to the embodiments of the present disclosure is particularly suitable for the single mode. However, the technique according to the embodiments of the present disclosure is not limited to the single mode, and is also applicable to the multi-mode. Further, a numerical aperture (NA: Numerical Aperture) of the fiber may differ depending on the fiber, but the technique according to the embodiments of the present disclosure is not limited to a fiber of a particular numerical aperture, and is applicable to a fiber having any numerical aperture.

Moreover, it is generally assumed that a power distribution of light outputted from a fiber (or outputted from an optical device) is a Gaussian distribution, but the technique according to the embodiments of the present disclosure is not limited to the Gaussian distribution and is applicable to a light source having a non-uniform power intensity distribution.

Further, by using the technique according to the embodiments of the present disclosure, for example, by vibrating the fiber every time of fitting of the optical communication connectors or every predetermined time, it is also possible to cause an unnecessary substance or dust to be dropped from the optical axis of the fiber, thereby improving the communication quality.

In the above, the modifications have been described.

5. CONCLUSION

As described above, according to the embodiments of the present disclosure, there is provided an optical communication connector that includes a control unit. The control unit controls alignment of a ferrule and a lens. The ferrule is to fix a fiber. The control unit varies a shape of a shape variation member on the basis of a communication quality of light entering the fiber via the lens to control the alignment. With such a configuration, it is possible to suppress degradation of quality of communication using a fiber.

For example, as described above, in a case where the single mode is used, the cost tends to increase as compared with the case where the multi-mode is used. Therefore, particularly in the case where the single mode is used, it is required to provide a technique of performing alignment of the optical axis of the fiber with high accuracy while suppressing an increase in cost. According to the embodiments of the present disclosure, it is possible to perform the alignment of the optical axis of the fiber with high accuracy while suppressing an increase in cost.

Further, the effects described herein are merely illustrative and exemplary, and not limitative. That is, with or in the place of the above-described effects, the technology according to the present disclosure may achieve other effects that are clear to those skilled in the art from the description of this specification.

Note that the following configurations also belong to the technical scope of the present disclosure.

(1)
An optical communication connector including
a control unit that controls alignment of a ferrule and a lens, the ferrule being to fix a fiber, in which
the control unit varies a shape of a shape variation member on the basis of a communication quality of light entering the fiber via the lens to control the alignment.

(2)
The optical communication connector according to (1) described above, in which
the shape variation member includes a piezo element, and
the control unit varies a voltage applied to the piezo element to vary the shape of the shape variation member.

(3)
The optical communication connector according to (1) or (2) described above, in which the control unit determines whether or not sensor data satisfies a predetermined condition, and controls the alignment in a case where the sensor data satisfies the predetermined condition.

(4)
The optical communication connector according to (3) described above, in which the control unit determines whether or not the sensor data satisfies the predetermined condition for each of two or more directions, and controls the alignment in a direction corresponding to any, of the directions, satisfying the predetermined condition.

(5)

The optical communication connector according to any one of (1) to (4) described above, in which the communication quality includes an absolute value of power of the light entering the fiber, number of times of errors occurring in the light, or both.

(6)

The optical communication connector according to any one of (1) to (5) described above, in which the control unit determines a maximum communication quality of communication qualities corresponding to two or more respective positional relationships between the ferrule and the lens, and controls the alignment in accordance with any, of the positional relationships, corresponding to the maximum communication quality.

(7)

The optical communication connector according to any one of (1) to (6) described above, in which
the shape variation member is coupled to a surface, of the ferrule, that is parallel to an axial direction of the fiber, and
the control unit varies the shape of the shape variation member to control alignment of the ferrule in a direction orthogonal to the axial direction of the fiber.

(8)

The optical communication connector according to any one of (1) to (7) described above, in which
the shape variation member is coupled to a surface, of the ferrule, that is orthogonal to an axial direction of the fiber, and
the control unit varies the shape of the shape variation member to control alignment of the ferrule in the axial direction of the fiber.

(9)

The optical communication connector according to any one of (1) to (8) described above, in which
the shape variation member is coupled to a surface, of the ferrule, that is parallel to an axial direction of the fiber, and
the control unit varies the shape of the shape variation member to control alignment of the ferrule in a rotational direction of an axis of the fiber or in a rotational direction of a direction orthogonal to the axis of the fiber.

(10)

The optical communication connector according to any one of (1) to (9) described above, in which
the control unit controls the alignment of the ferrule and a lens array, the ferrule being to fix two or more fibers, the lens array including lenses corresponding to the respective fibers, and
the control unit varies the shape of the shape variation member on the basis of a communication quality of light entering the two or more fibers via the lens array to control the alignment.

(11)

The optical communication connector according to (10) described above, in which
the shape variation member is coupled to a surface, of the ferrule, that is parallel to axial directions of the two or more fibers, and
the control unit varies the shape of the shape variation member to control alignment of the ferrule with respect to a rotational direction of a central axis of the two or more fibers.

(12)

The optical communication connector according to any one of (1) to (11) described above, in which an elastic body is coupled to the ferrule, the lens, or both.

(13)

The optical communication connector according to any one of (1) to (12) described above, in which
a light transmissive shape variation material is provided between the lens and the fiber, the light transmissive shape variation material being coupled to the shape variation member, and
the control unit varies the shape of the shape variation member and a shape of the light transmissive shape variation material to vary a path of light to thereby control the alignment.

(14)

The optical communication connector according to any one of (1) to (12) described above, in which
a light transmissive shape variation material is provided between the lens and the fiber, the light transmissive shape variation material being coupled to the shape variation member, and
the control unit diffuses light from the fiber in a case where the optical communication connector is not fitted with another connector, and the control unit varies the shape of the shape variation member and a shape of the light transmissive shape variation material to vary a path of light to thereby shape the light from the fiber in a case where the optical communication connector is fitted with another connector.

(15)

A control method including:
causing a processor to control alignment of a ferrule and a lens, the ferrule being to fix a fiber; and
causing the processor to vary a shape of a shape variation member on the basis of a communication quality of light entering the fiber via the lens to thereby control the alignment.

(16)

An optical communication connector including
a control unit that controls alignment of an optical device and a lens, in which
the control unit varies a shape of a shape variation member on the basis of a communication quality of light reaching the optical device via the lens to control the alignment.

(17)

A control method including:
causing a processor to control alignment of an optical device and a lens; and
causing the processor to vary a shape of a shape variation member on the basis of a communication quality of light reaching the optical device via the lens to thereby control the alignment.

(18)

An optical communication connector including
a control unit that controls alignment of a first ferrule and a second ferrule, the first ferrule being to fix a first fiber, the second ferrule being to fix a second fiber, in which
the control unit varies a shape of a shape variation member on the basis of a communication quality of light entering the first fiber via the second fiber to control the alignment.

(19)

A control method including:
causing a processor to control alignment of a first ferrule and a second ferrule, the first ferrule being to fix a first fiber, the second ferrule being to fix a second fiber; and causing the processor to vary a shape of a shape variation member on the basis of a communication quality of light entering the first fiber via the second fiber to thereby control the alignment.

(20)

An optical communication apparatus including
a control unit that controls alignment of a ferrule and a lens, the ferrule being to fix a fiber, in which
the control unit varies a shape of a shape variation member on the basis of a communication quality of light entering the fiber via the lens to control the alignment.

DESCRIPTION OF REFERENCE NUMERALS 1 to 8, 10 to 16, 18, and 19 optical communication connector
21 shape variation member
22 core
23 fiber
24 optical device
25 substrate
30 light transmissive material
31 light transmissive shape variation material
41 power monitor
42 control unit
50 connector outer member
51 elastic body
52 pedestal
53 leaf spring
110 light transmitting member
160 light transmitting member
162 lens
163-1 recess
163-2 convex
170 ferrule
171 hole
172 fiber fixing agent
173 ferrule
174 mirror

The invention claimed is:

1. An optical communication connector comprising
a control unit that controls alignment of a ferrule and a lens, the ferrule being to fix a fiber, wherein
the control unit varies a shape of a shape variation member on a basis of a communication quality of light entering the fiber via the lens to control the alignment.

2. The optical communication connector according to claim 1, wherein
the shape variation member includes a piezo element, and
the control unit varies a voltage applied to the piezo element to vary the shape of the shape variation member.

3. The optical communication connector according to claim 1, wherein the control unit determines whether or not sensor data satisfies a predetermined condition, and controls the alignment in a case where the sensor data satisfies the predetermined condition.

4. The optical communication connector according to claim 3, wherein the control unit determines whether or not the sensor data satisfies the predetermined condition for each of two or more directions, and controls the alignment in a direction corresponding to any, of the directions, satisfying the predetermined condition.

5. The optical communication connector according to claim 1, wherein the communication quality includes an absolute value of power of the light entering the fiber, number of times of errors occurring in the light, or both.

6. The optical communication connector according to claim 1, wherein the control unit determines a maximum communication quality of communication qualities corresponding to two or more respective positional relationships between the ferrule and the lens, and controls the alignment in accordance with any, of the positional relationships, corresponding to the maximum communication quality.

7. The optical communication connector according to claim 1, wherein
the shape variation member is coupled to a surface, of the ferrule, that is parallel to an axial direction of the fiber, and
the control unit varies the shape of the shape variation member to control alignment of the ferrule in a direction orthogonal to the axial direction of the fiber.

8. The optical communication connector according to claim 1, wherein
the shape variation member is coupled to a surface, of the ferrule, that is orthogonal to an axial direction of the fiber, and
the control unit varies the shape of the shape variation member to control alignment of the ferrule in the axial direction of the fiber.

9. The optical communication connector according to claim 1, wherein
the shape variation member is coupled to a surface, of the ferrule, that is parallel to an axial direction of the fiber, and
the control unit varies the shape of the shape variation member to control alignment of the ferrule in a rotational direction of an axis of the fiber or in a rotational direction of a direction orthogonal to the axis of the fiber.

10. The optical communication connector according to claim 1, wherein
the control unit controls the alignment of the ferrule and a lens array, the ferrule being to fix two or more fibers, the lens array including lenses corresponding to the respective fibers, and
the control unit varies the shape of the shape variation member on a basis of a communication quality of light entering the two or more fibers via the lens array to control the alignment.

11. The optical communication connector according to claim 10, wherein
the shape variation member is coupled to a surface, of the ferrule, that is parallel to axial directions of the two or more fibers, and
the control unit varies the shape of the shape variation member to control alignment of the ferrule with respect to a rotational direction of a central axis of the two or more fibers.

12. The optical communication connector according to claim 1, wherein an elastic body is coupled to the ferrule, the lens, or both.

13. The optical communication connector according to claim 1, wherein
a light transmissive shape variation material is provided between the lens and the fiber, the light transmissive shape variation material being coupled to the shape variation member, and
the control unit varies the shape of the shape variation member and a shape of the light transmissive shape variation material to vary a path of light to thereby control the alignment.

14. The optical communication connector according to claim 1, wherein a light transmissive shape variation material is provided between the lens and the fiber, the light transmissive shape variation material being coupled to the shape variation member, and the control unit diffuses light from the fiber in a case where the optical communication connector is not fitted with another connector, and the control unit varies the shape of the shape variation member and a shape of the light transmissive shape variation material to vary a path of light to thereby shape the light from the fiber in a case where the optical communication connector is fitted with another connector.

15. A control method comprising:

causing a processer to control alignment of a ferrule and a lens, the ferrule being to fix a fiber; and causing the processor to vary a shape of a shape variation member on a basis of a communication quality of light entering the fiber via the lens to thereby control the alignment.

16. An optical communication connector comprising a control unit that controls alignment of an optical device and a lens, wherein the control unit varies a shape of a shape variation member on a basis of a communication quality of light reaching the optical device via the lens to control the alignment.

17. A control method comprising:

causing a processor to control alignment of an optical device and a lens; and causing the processor to vary a shape of a shape variation member on a basis of a communication quality of light reaching the optical device via the lens to thereby control the alignment.

18. An optical communication connector comprising a control unit that controls alignment of a first ferrule and a second ferrule, the first ferrule being to fix a first fiber, the second ferrule being to fix a second fiber, wherein the control unit varies a shape of a shape variation member on a basis of a communication quality of light entering the first fiber via the second fiber to control the alignment.

19. A control method comprising:

causing a processor to control alignment of a first ferrule and a second ferrule, the first ferrule being to fix a first fiber, the second ferrule being to fix a second fiber; and causing the processor to vary a shape of a shape variation member on a basis of a communication quality of light entering the first fiber via the second fiber to thereby control the alignment.

20. An optical communication apparatus comprising a control unit that controls alignment of a ferrule and a lens, the ferrule being to fix a fiber, wherein the control unit varies a shape of a shape variation member on a basis of a communication quality of light entering the fiber via the lens to control the alignment.

\* \* \* \* \*